April 7, 1931. A. A. CLOKEY 1,799,214
SUBMARINE TELEGRAPH SYSTEM
Filed March 7, 1929 24 Sheets-Sheet 1

INVENTOR
A. A. CLOKEY
BY J. W. Schmied
ATTORNEY

April 7, 1931.  A. A. CLOKEY  1,799,214
SUBMARINE TELEGRAPH SYSTEM
Filed March 7, 1929   24 Sheets-Sheet 2

INVENTOR
A. A. CLOKEY
BY J. W. Schmied
ATTORNEY

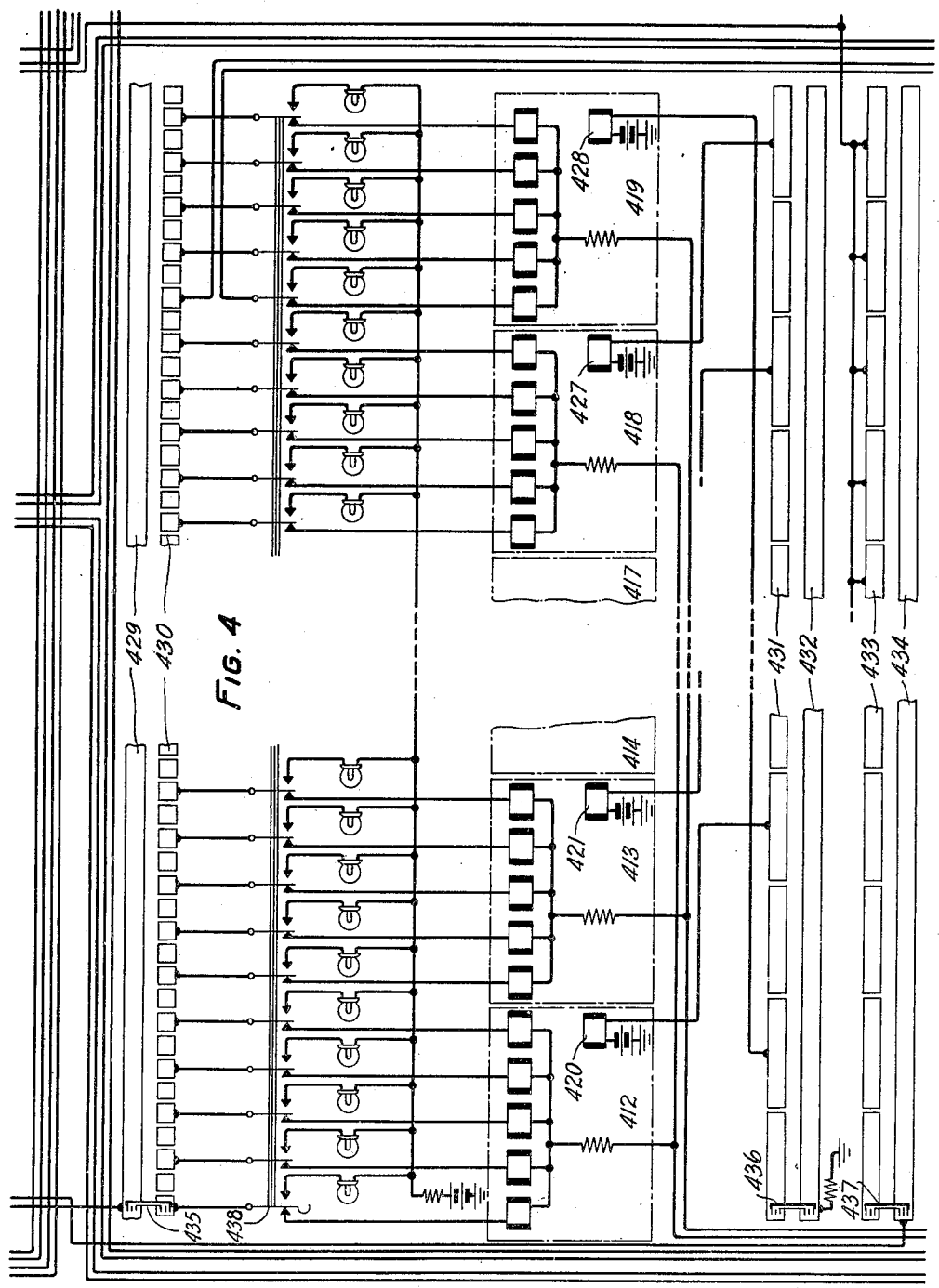

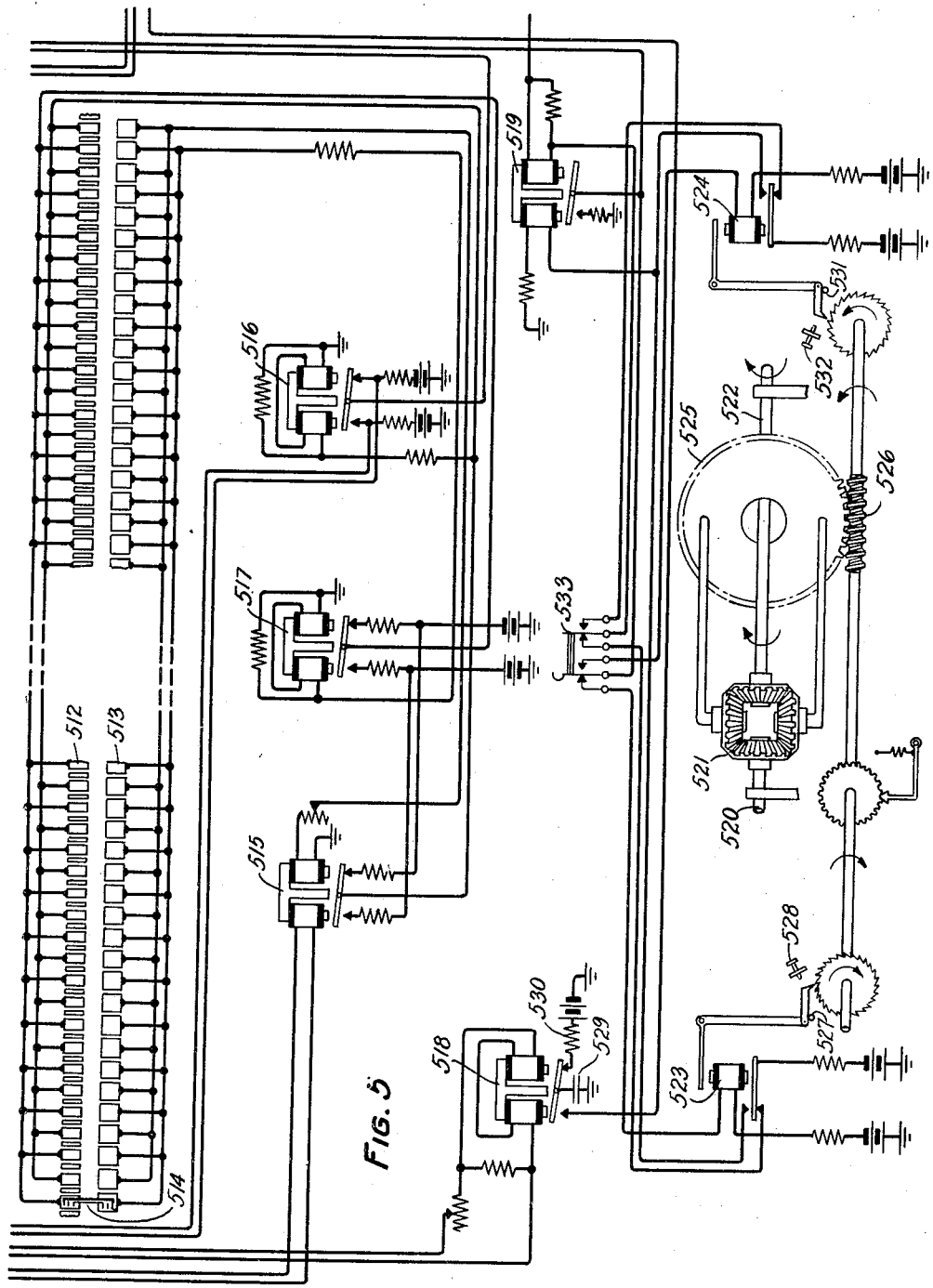

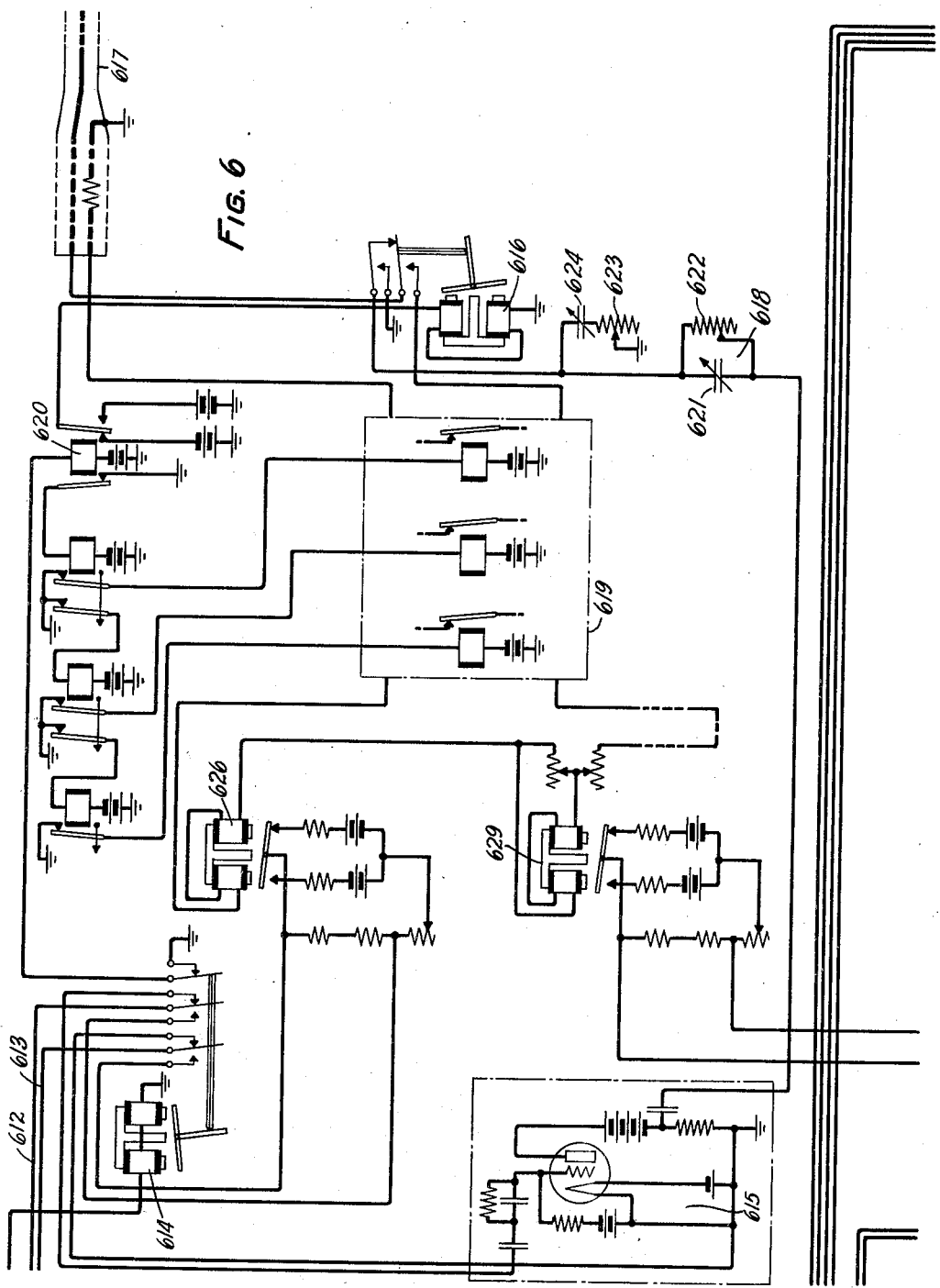

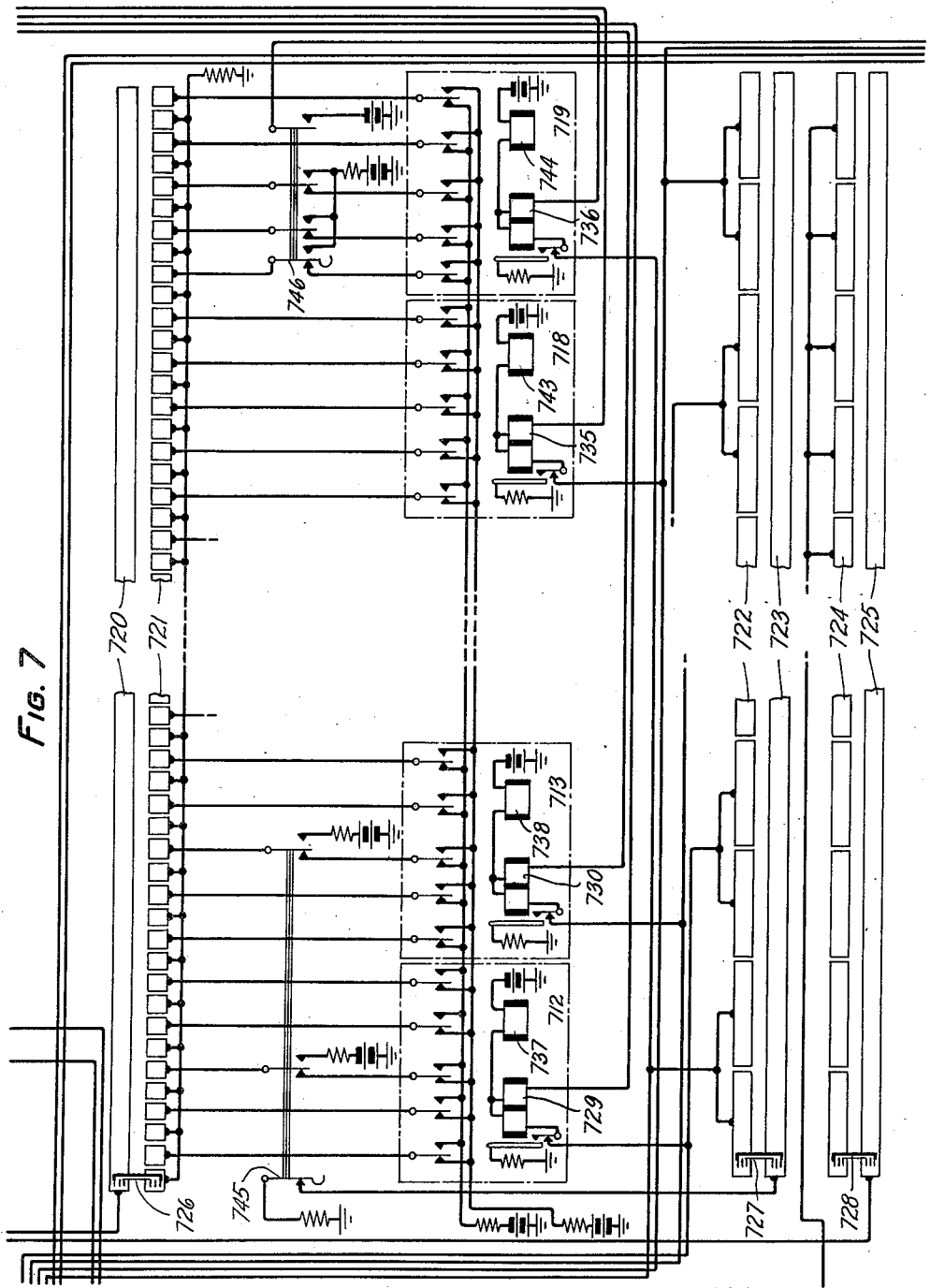

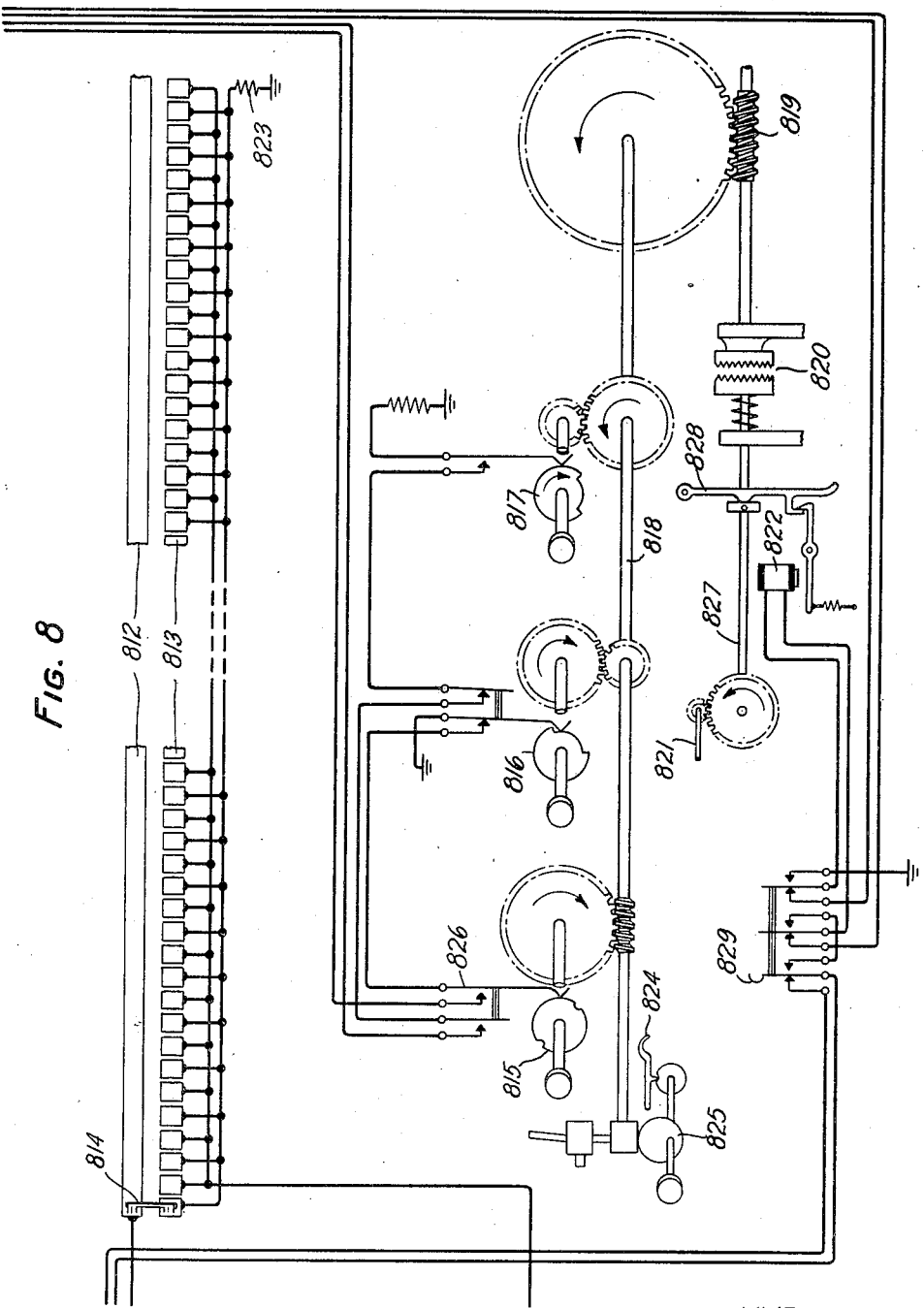

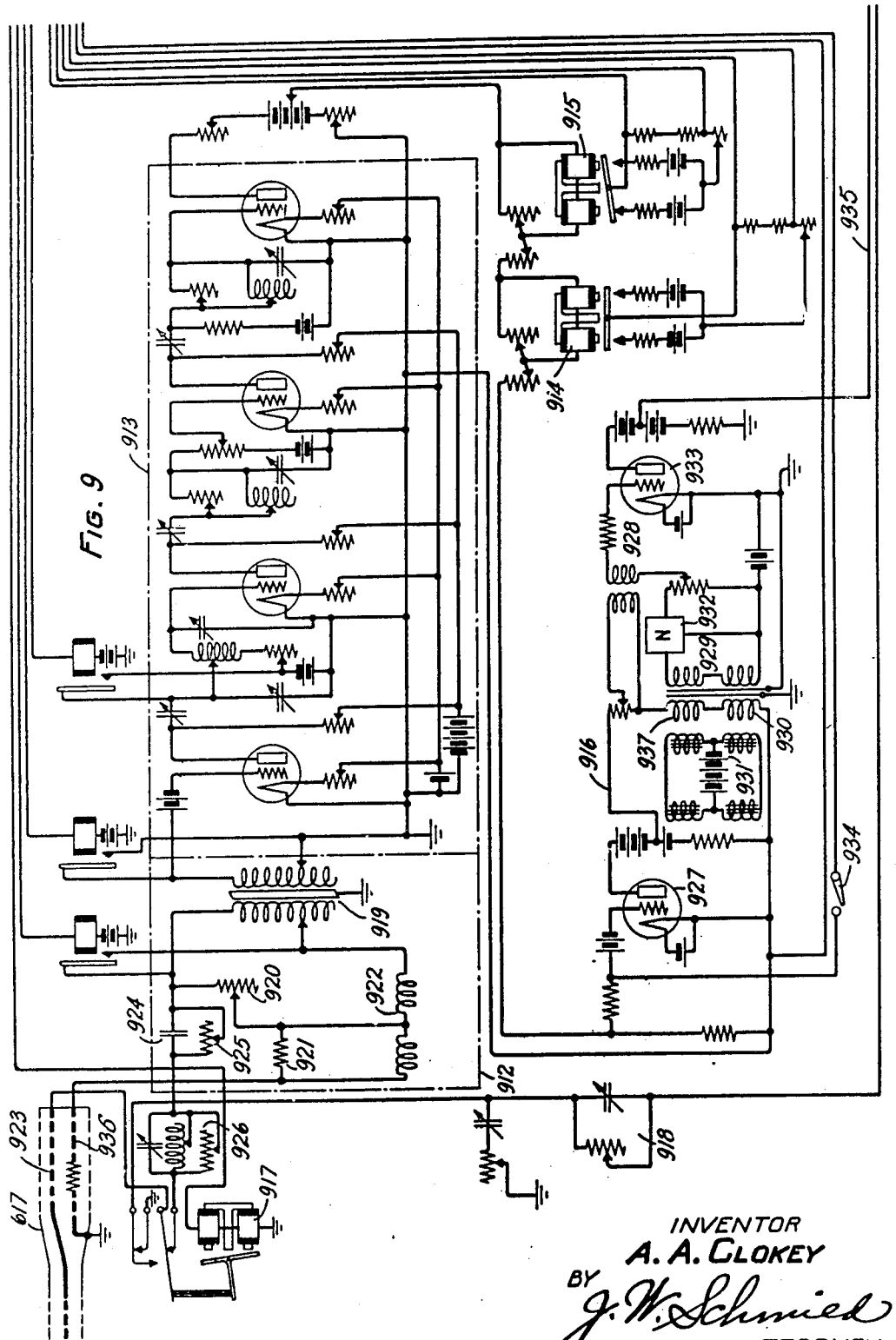

April 7, 1931. A. A. CLOKEY 1,799,214
SUBMARINE TELEGRAPH SYSTEM
Filed March 7, 1929 24 Sheets-Sheet 10
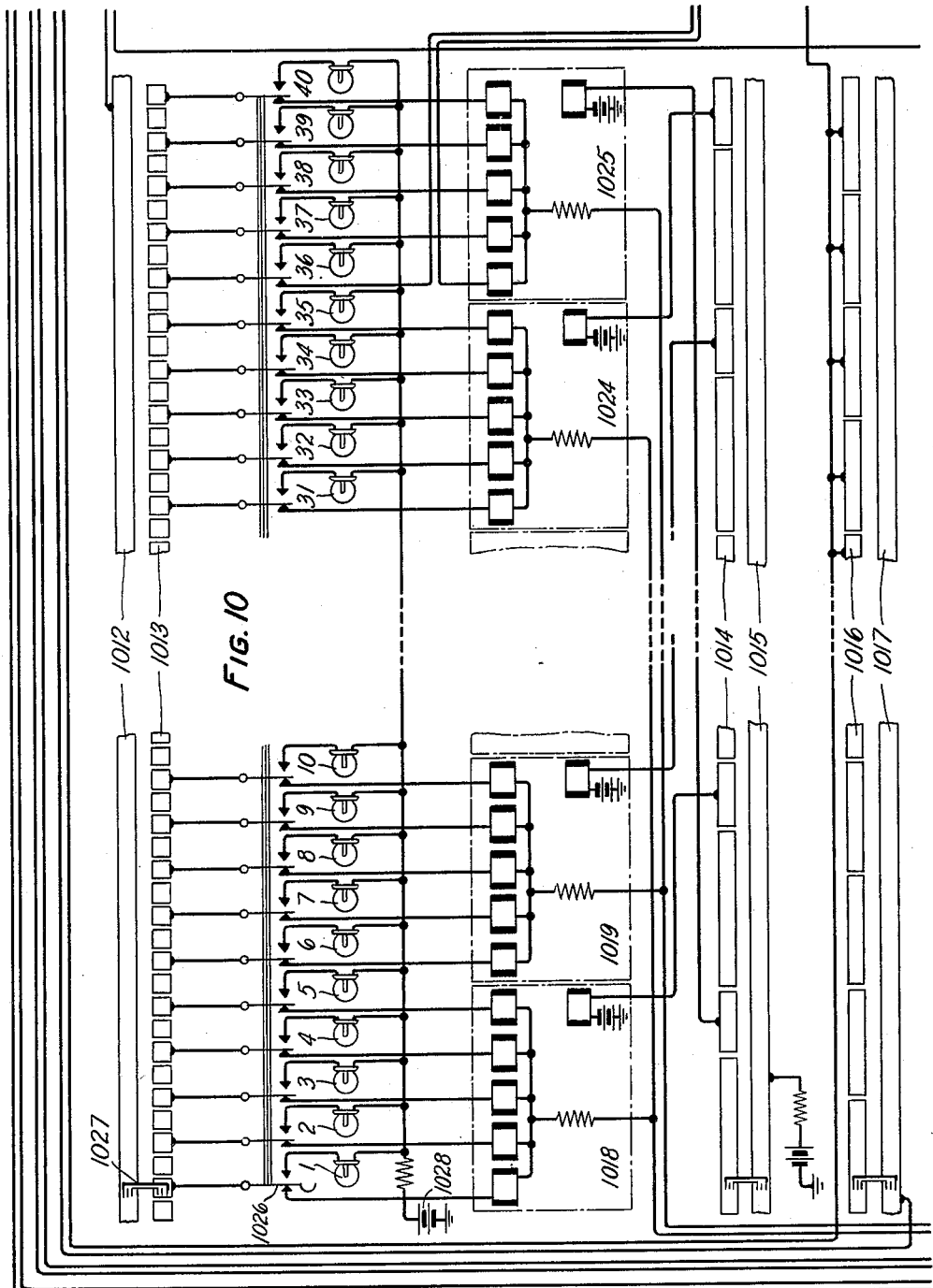
INVENTOR
A. A. CLOKEY
BY J. W. Schmied
ATTORNEY

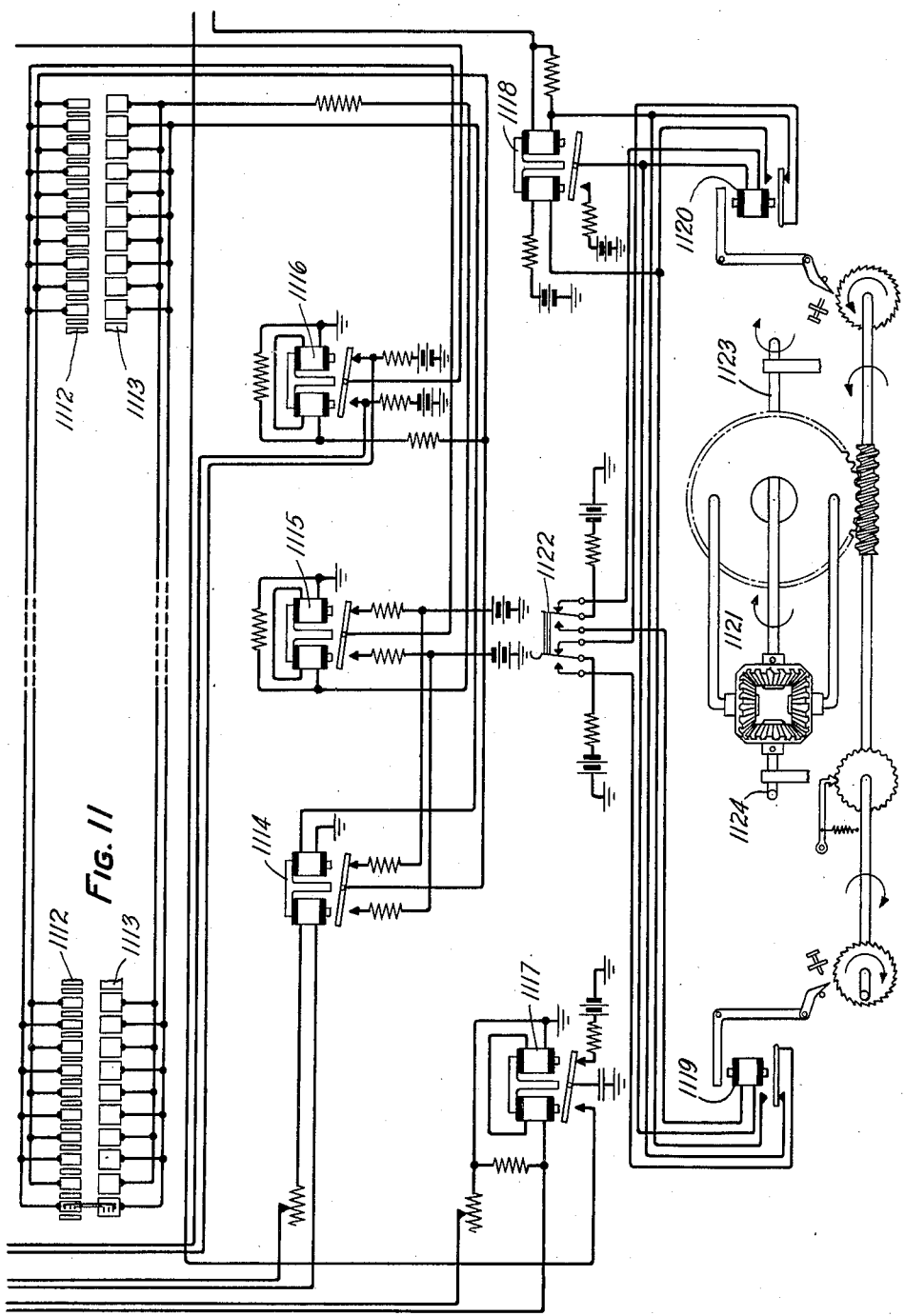

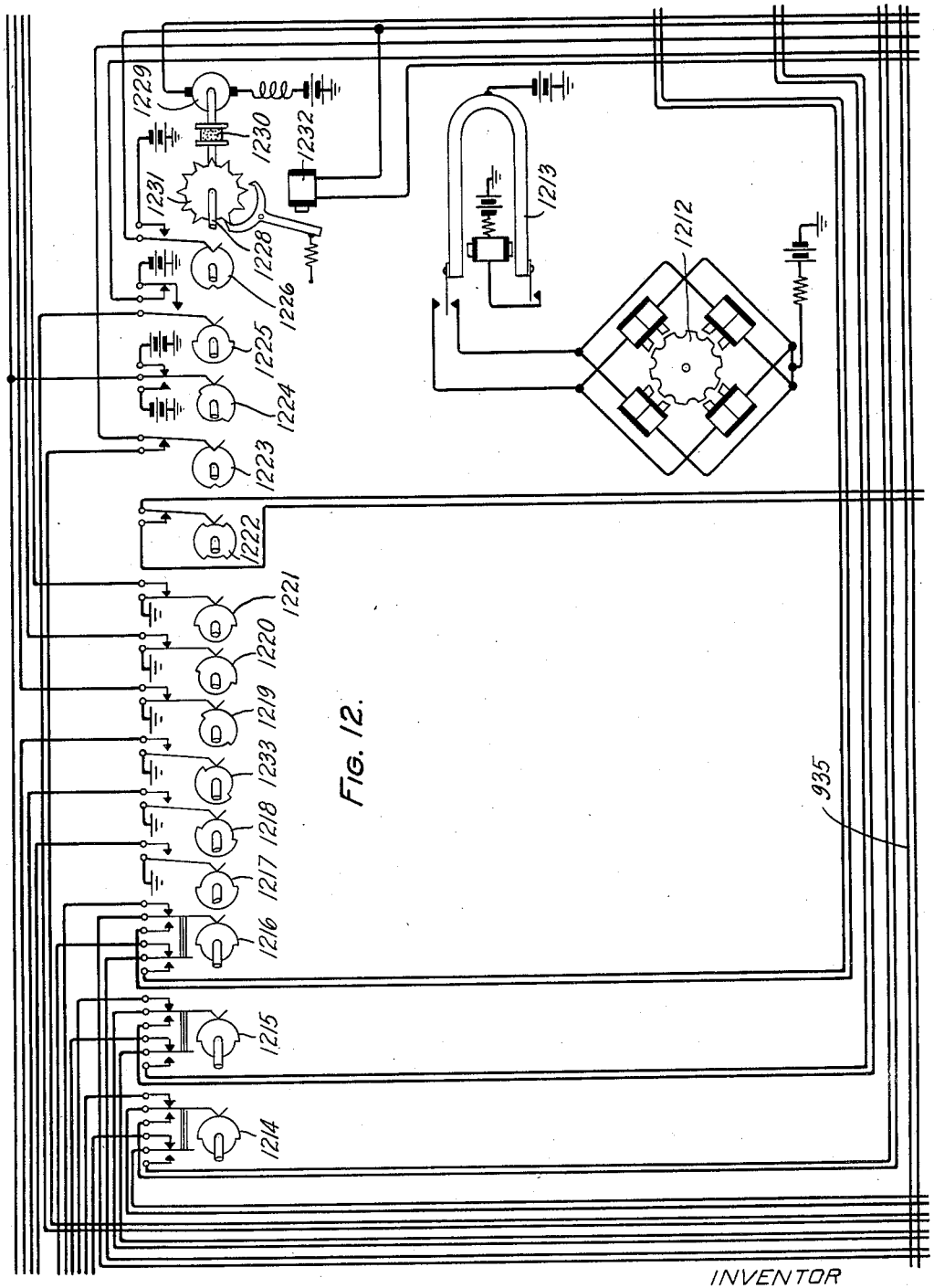

April 7, 1931. A. A. CLOKEY 1,799,214
SUBMARINE TELEGRAPH SYSTEM
Filed March 7, 1929 24 Sheets-Sheet 13
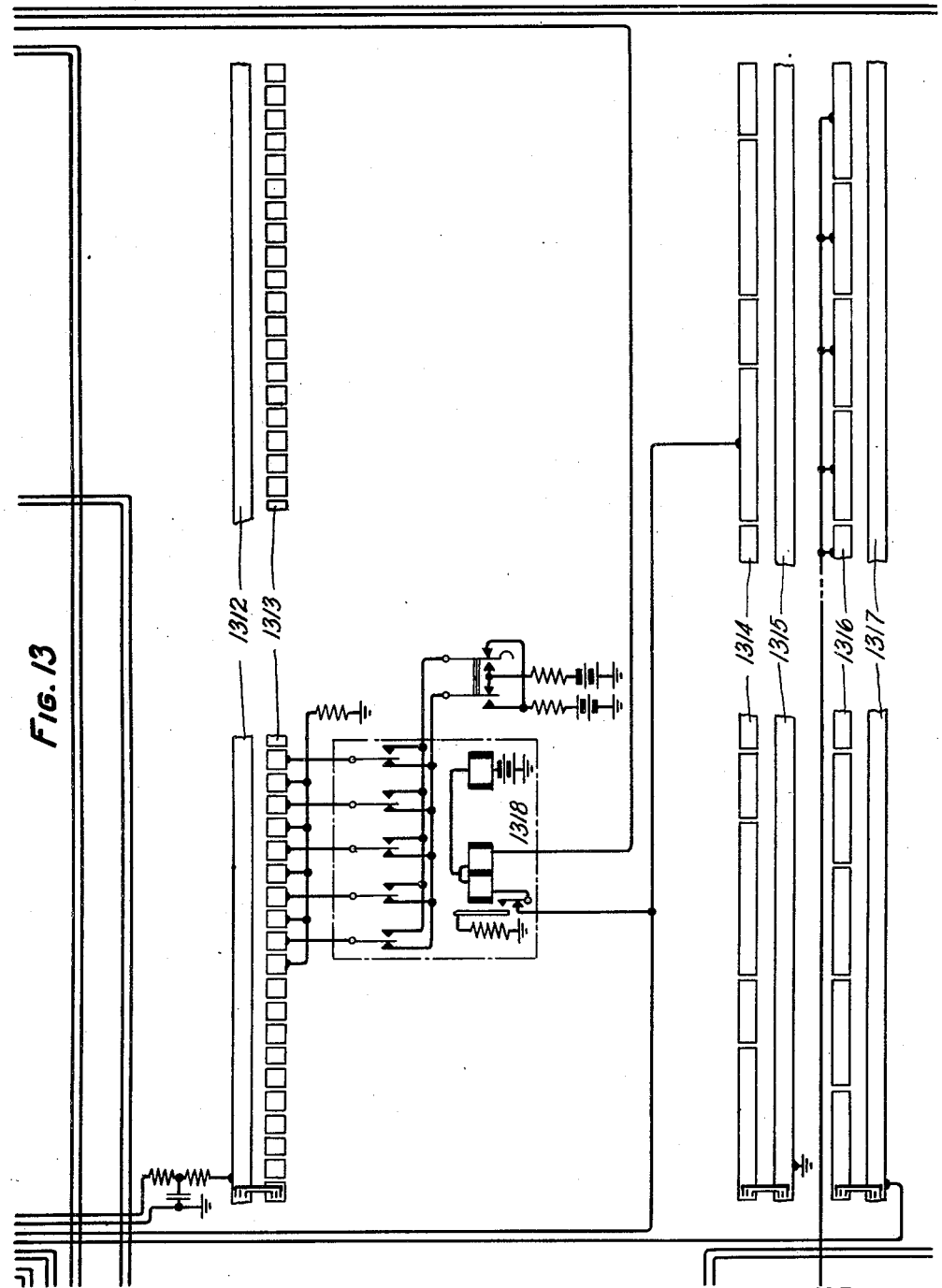
INVENTOR
A. A. CLOKEY
BY
J. W. Schmied
ATTORNEY

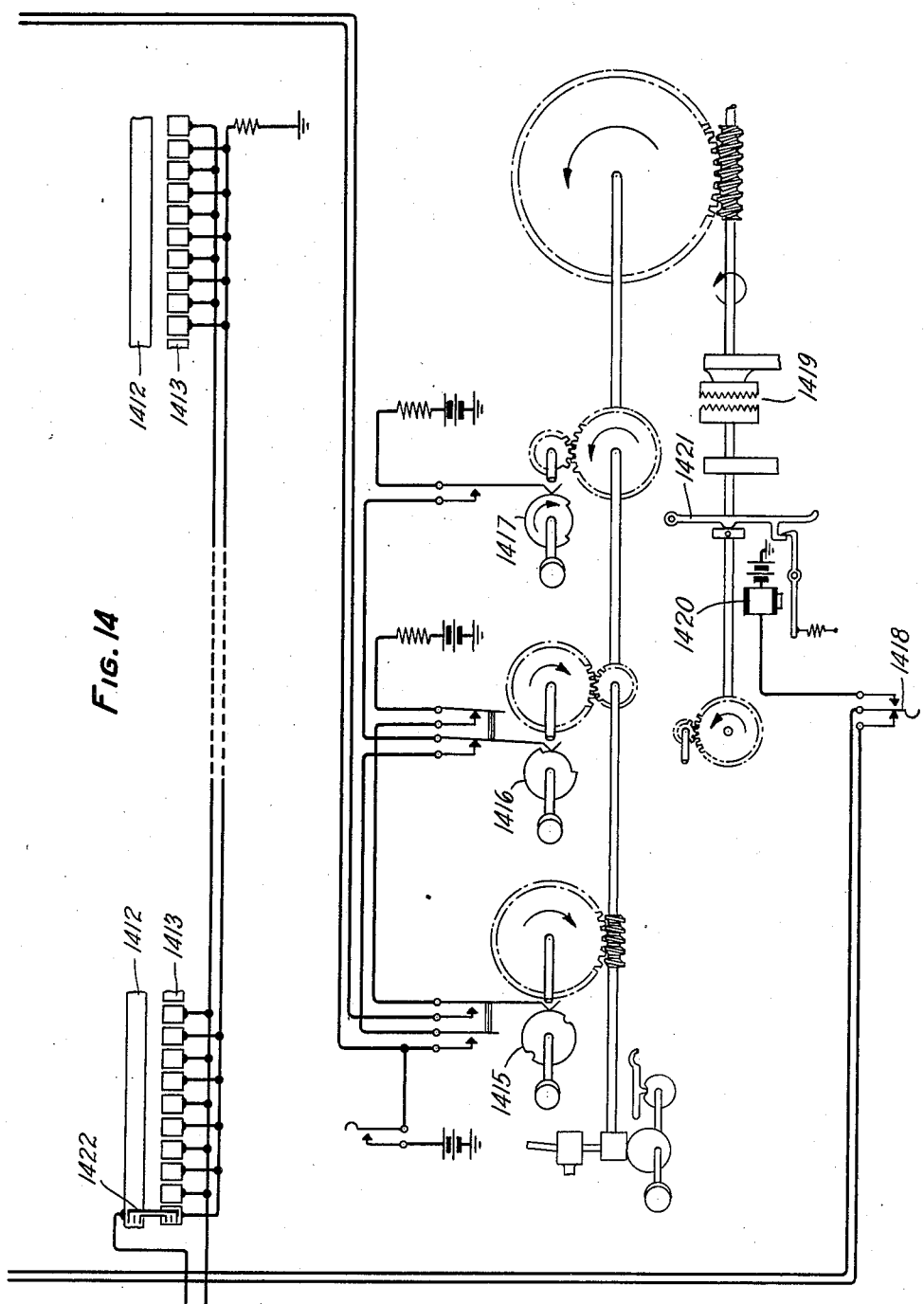

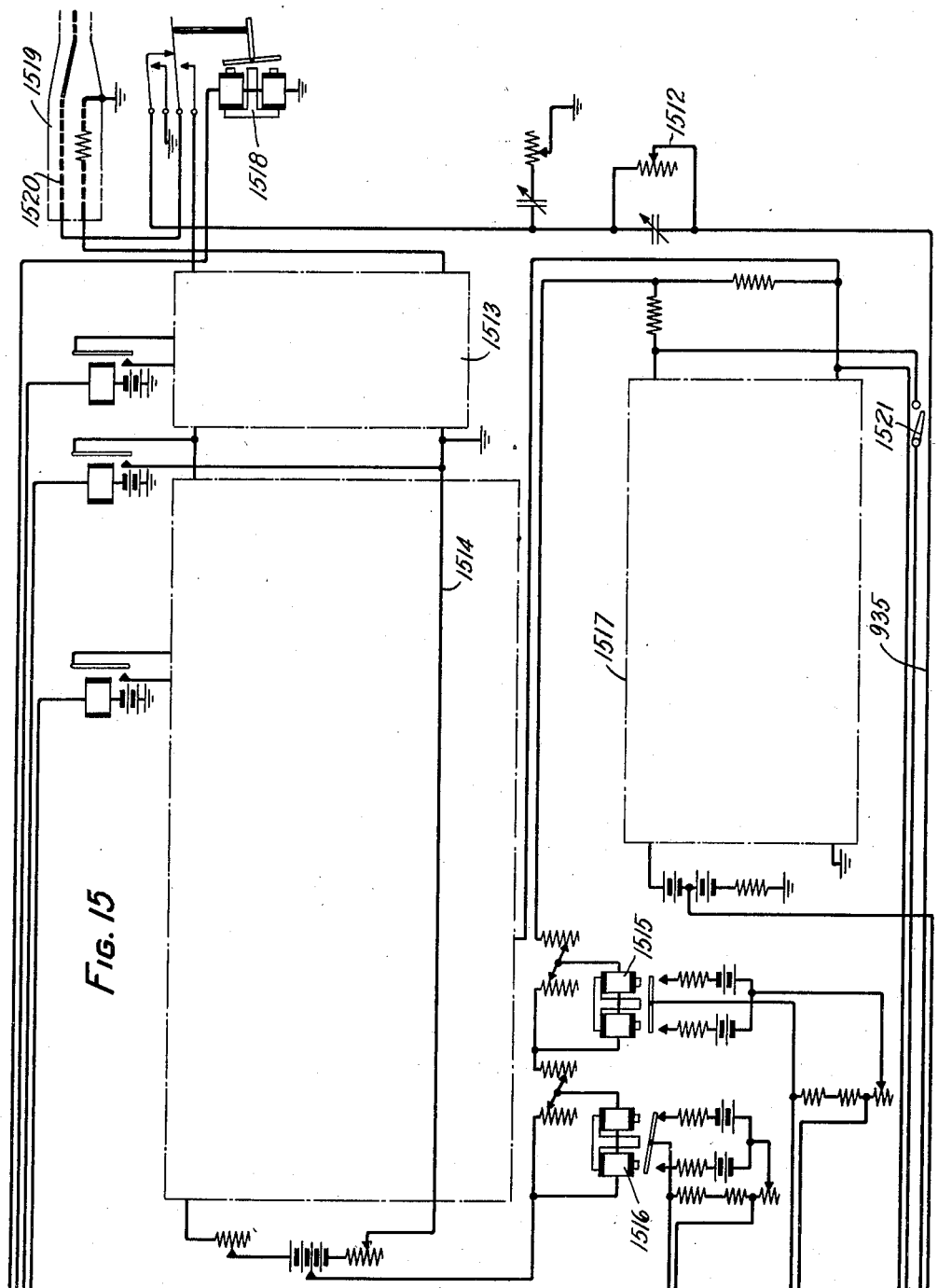

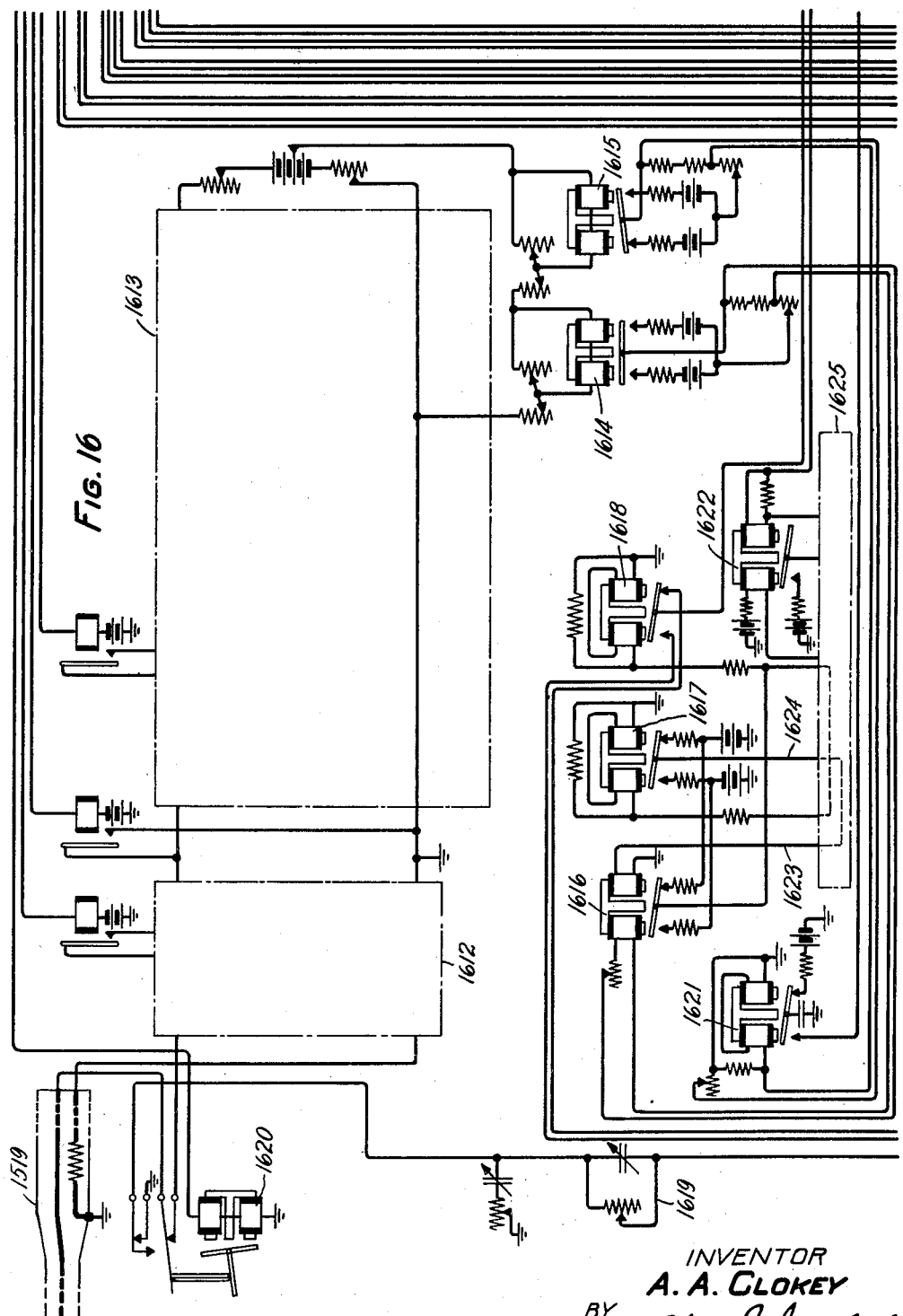

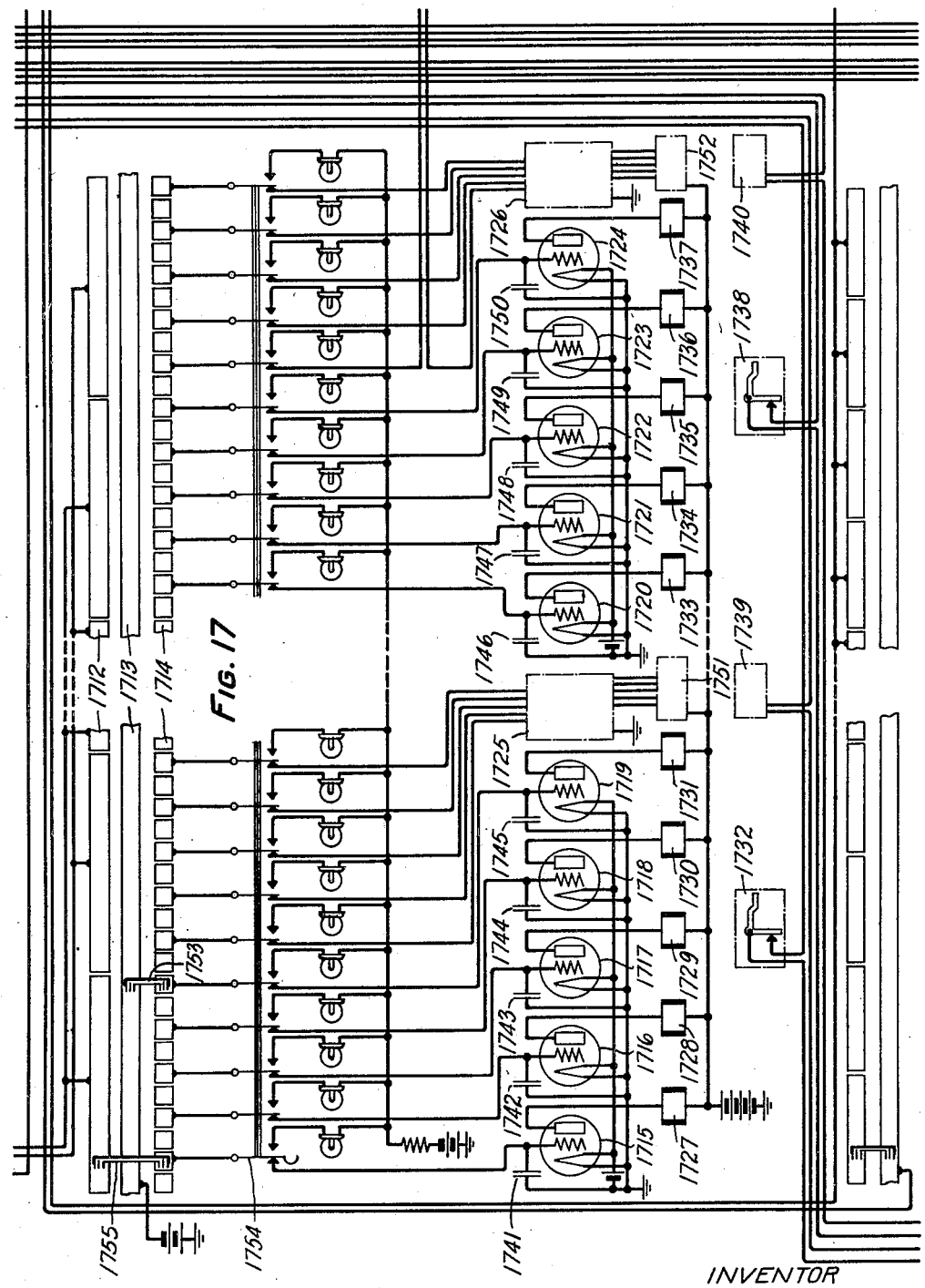

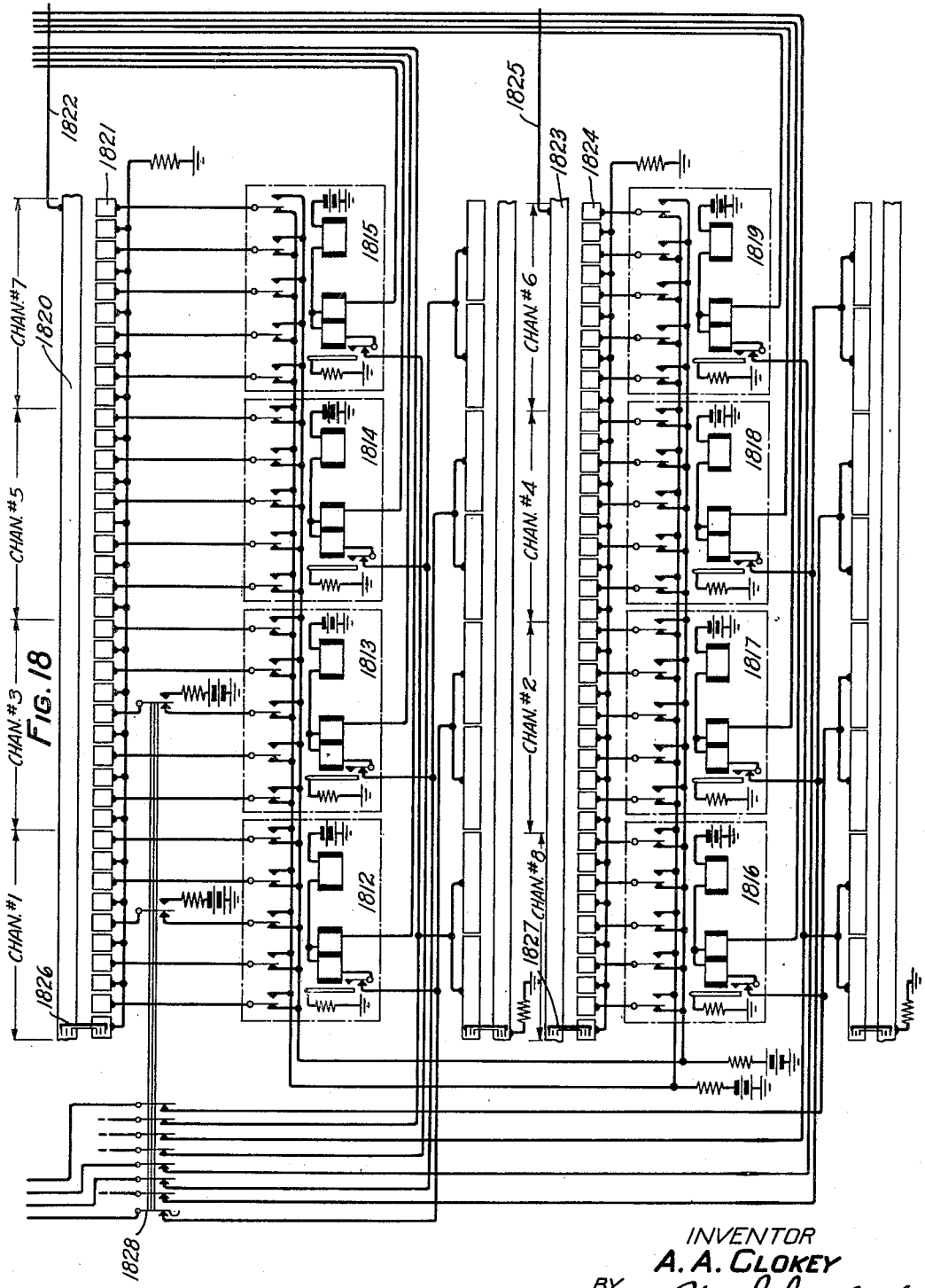

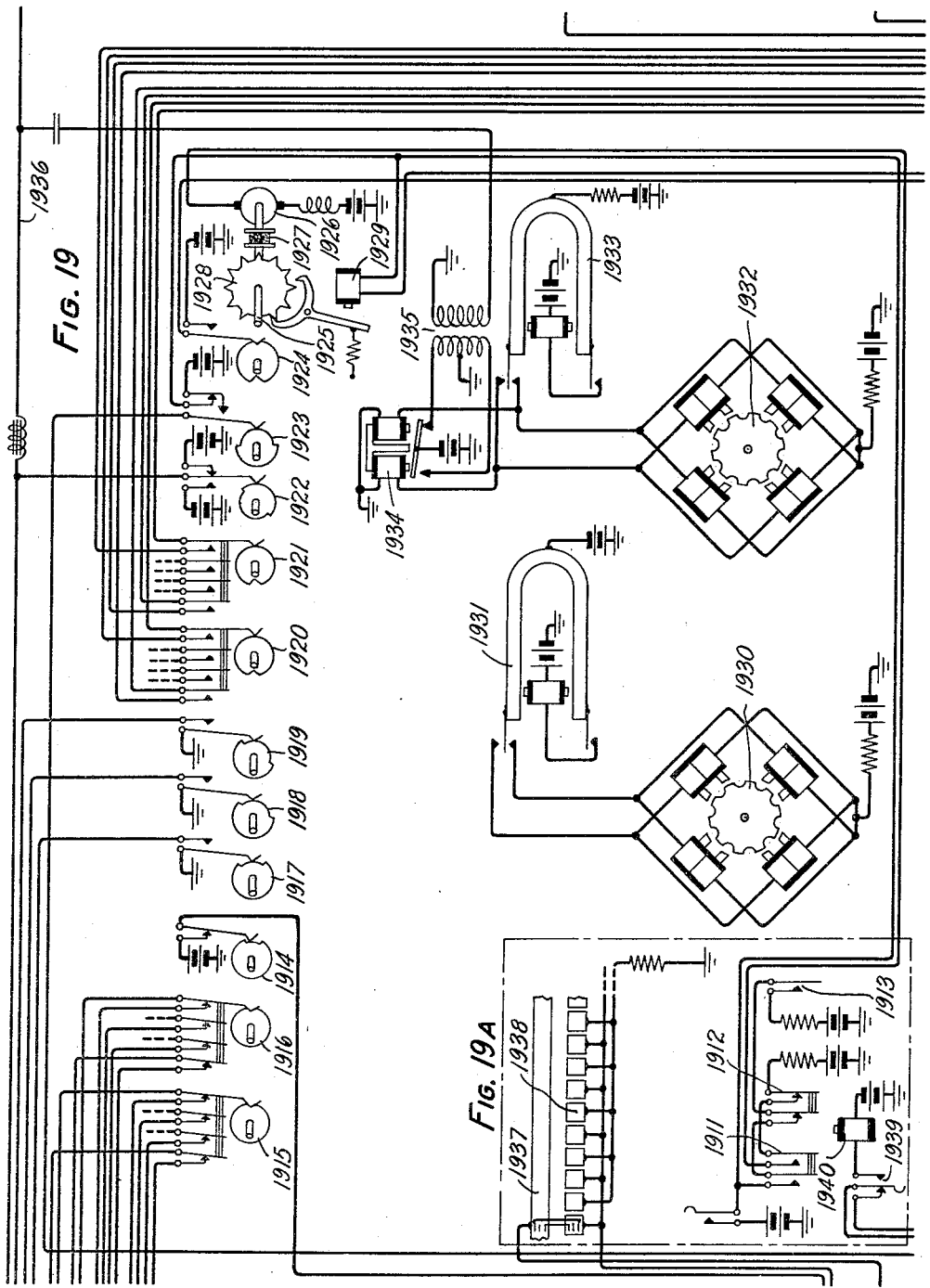

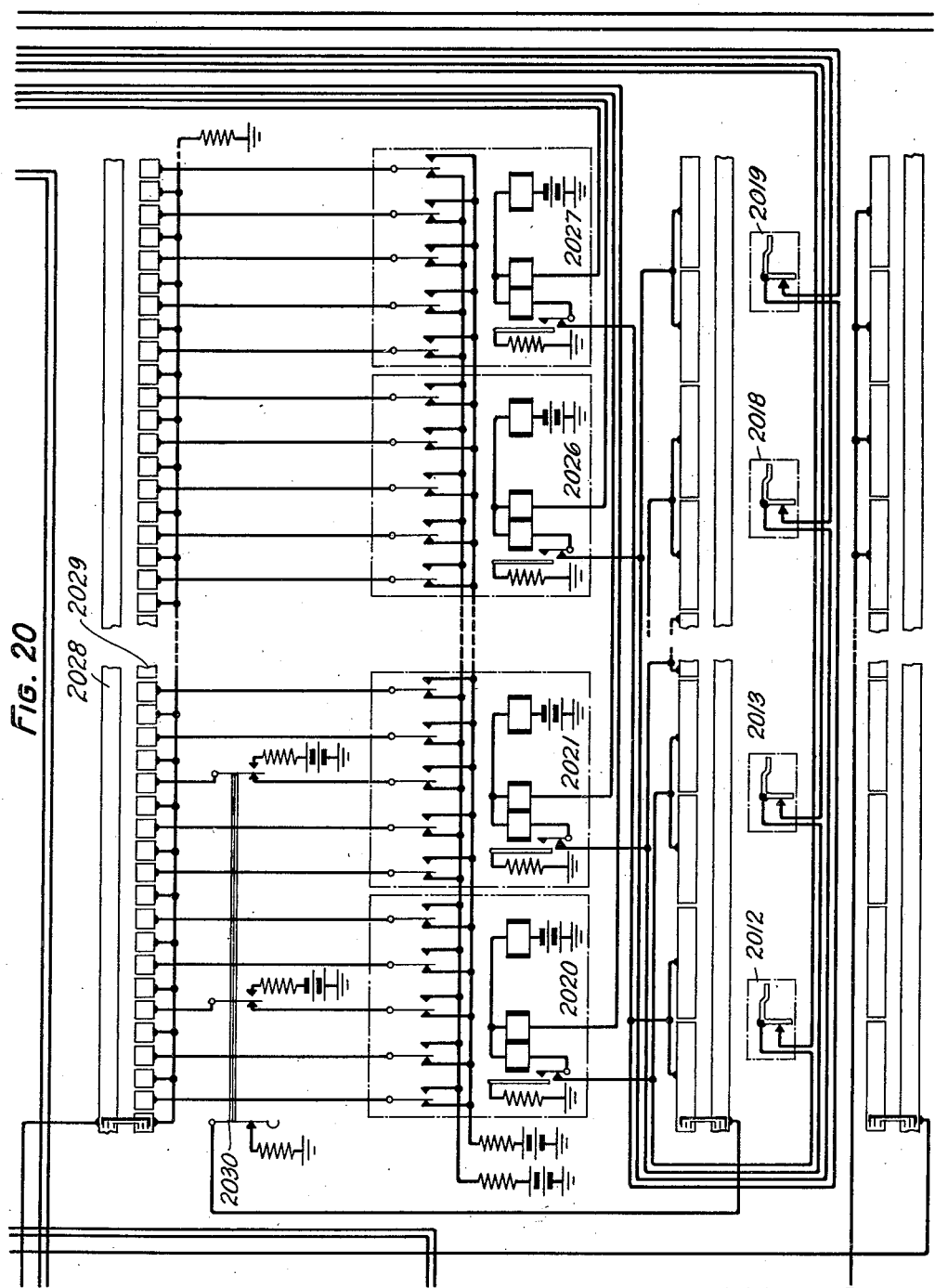

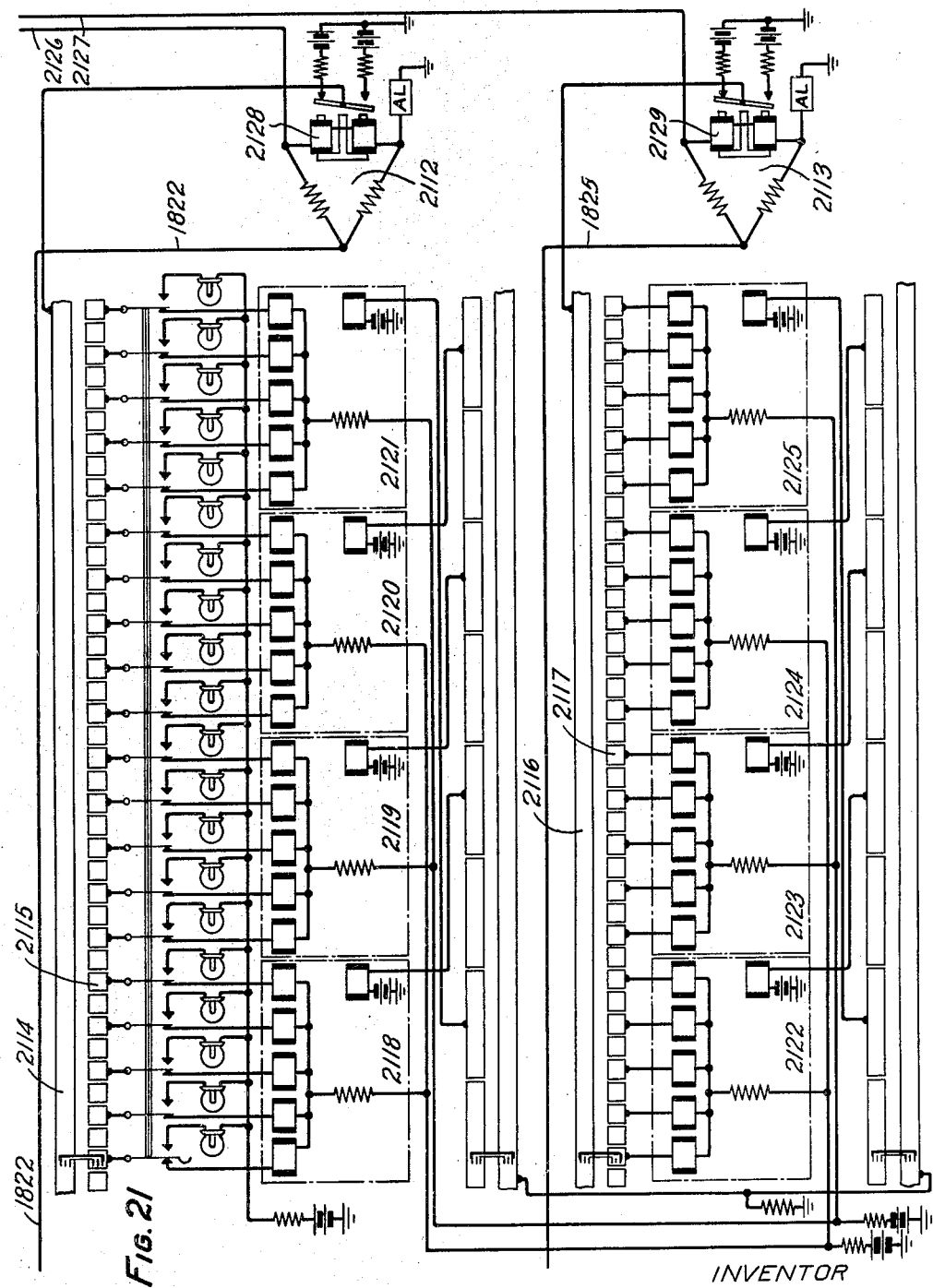

April 7, 1931.  A. A. CLOKEY  1,799,214
SUBMARINE TELEGRAPH SYSTEM
Filed March 7, 1929   24 Sheets-Sheet 22
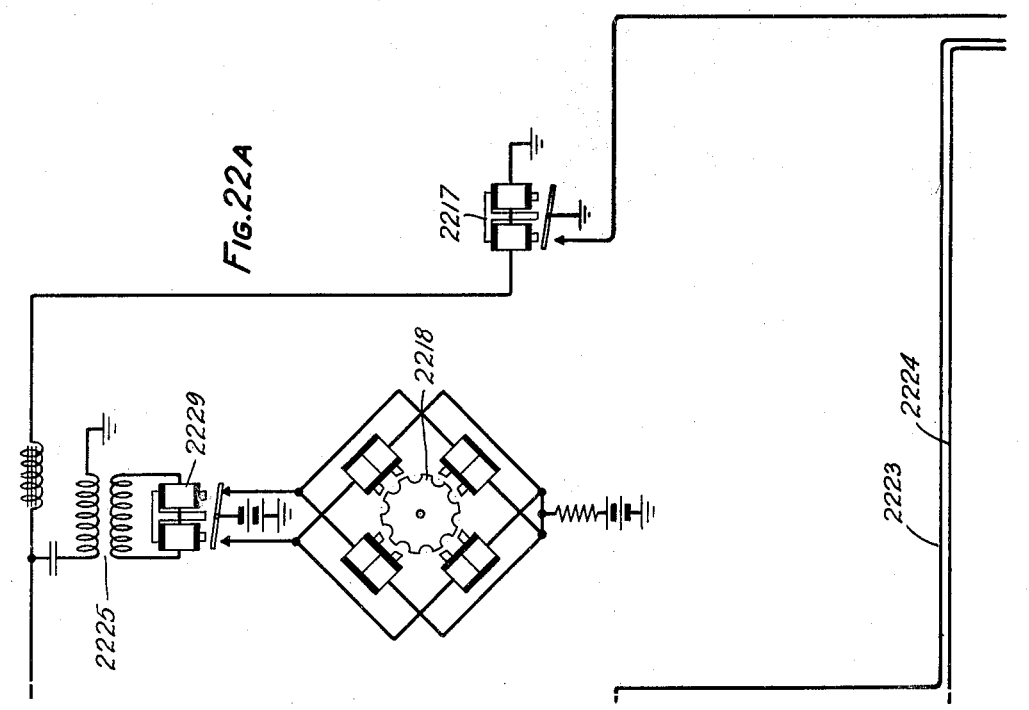
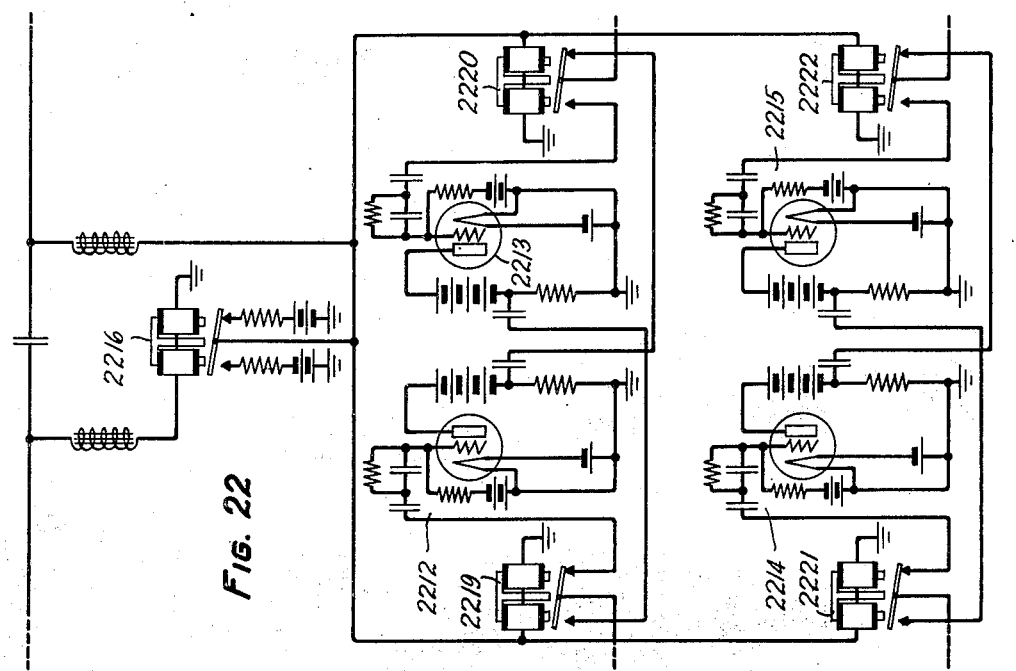
INVENTOR
A. A. CLOKEY
BY J. W. Schmied
ATTORNEY

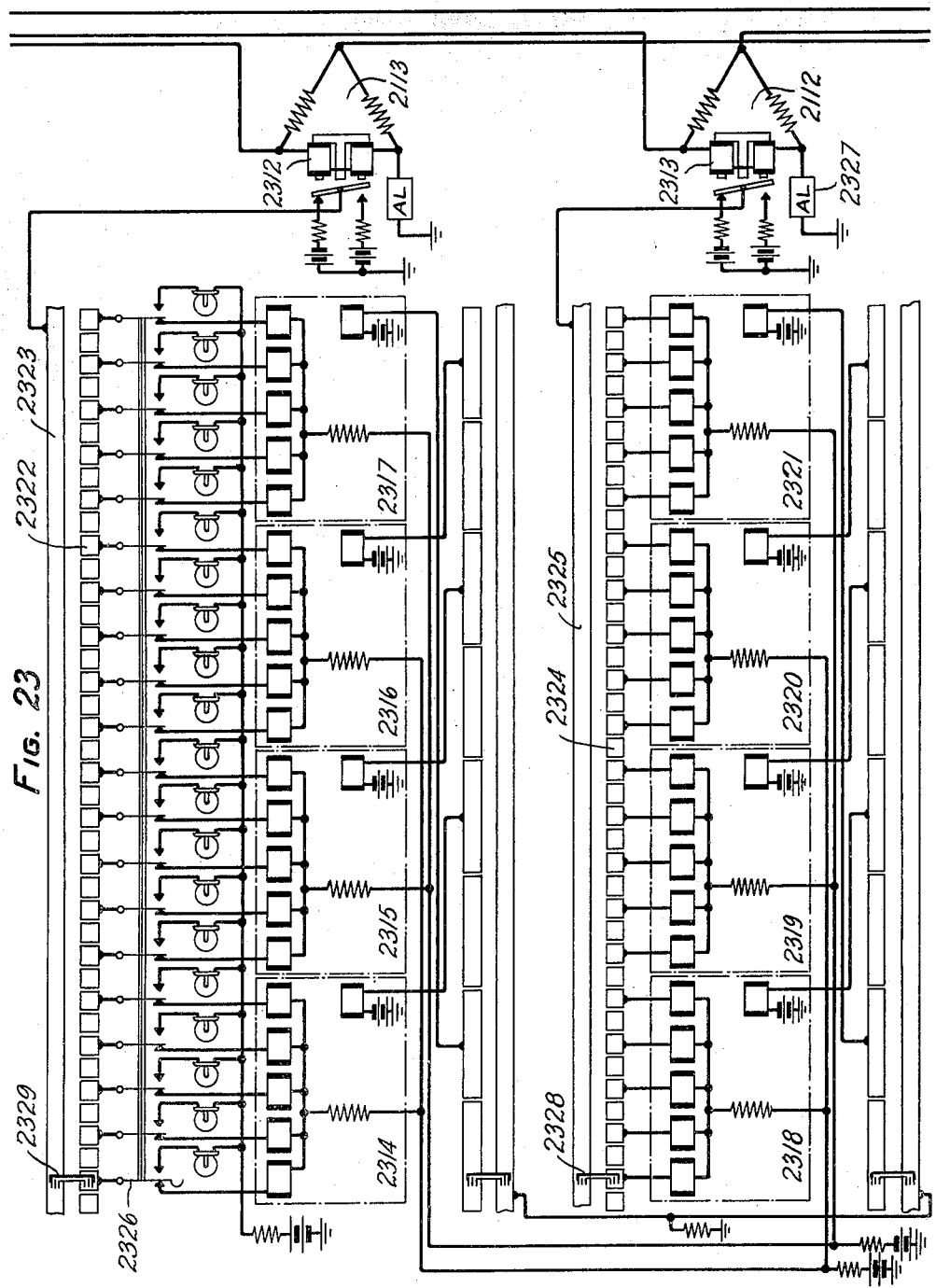

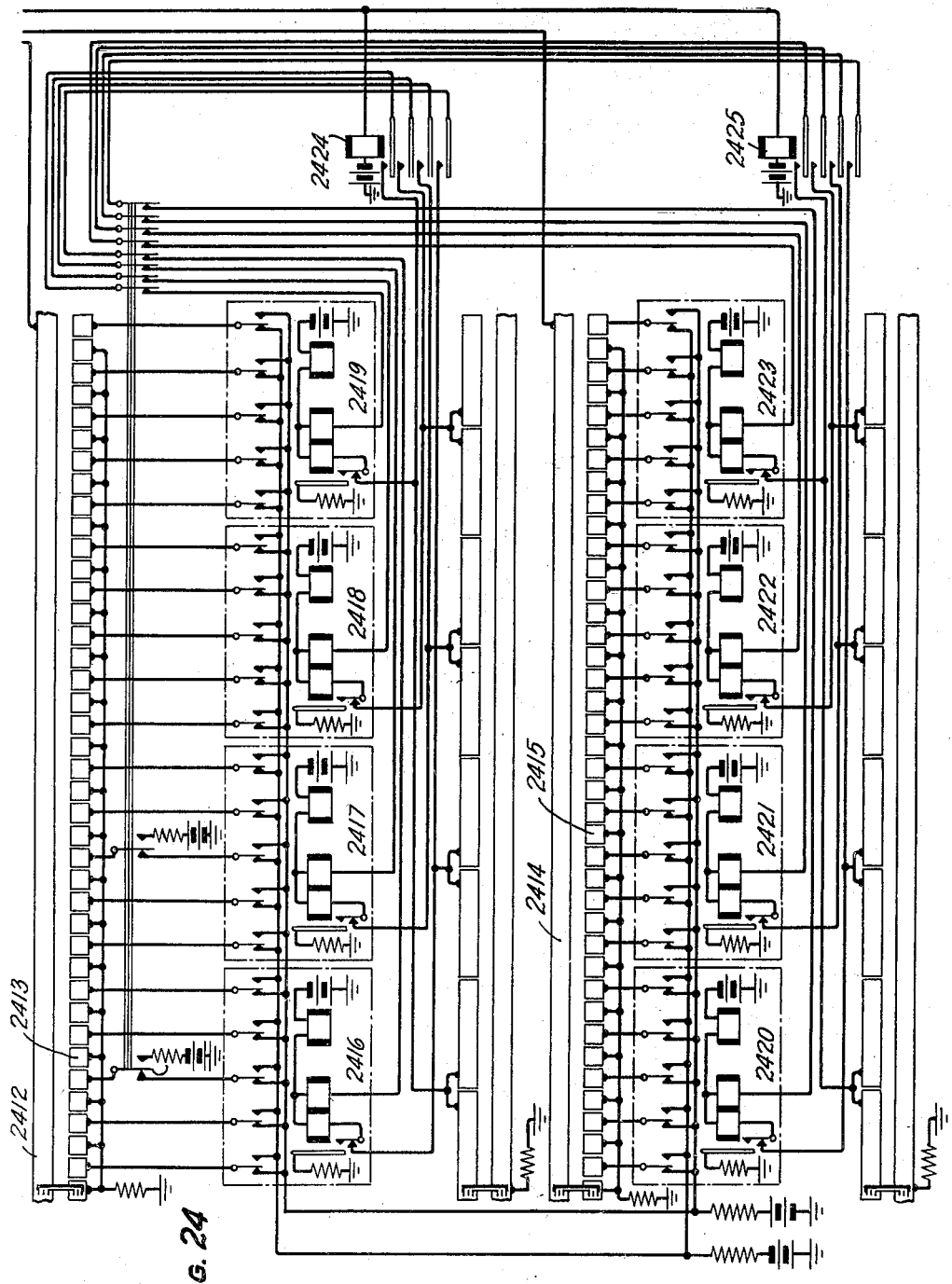

Patented Apr. 7, 1931

1,799,214

UNITED STATES PATENT OFFICE

ALLISON A. CLOKEY, OF RUTHERFORD, NEW JERSEY, ASSIGNOR TO BELL TELEPHONE LABORATORIES, INCORPORATED, OF NEW YORK, N. Y., A CORPORATION OF NEW YORK

SUBMARINE TELEGRAPH SYSTEM

Application filed March 7, 1929. Serial No. 344,955.

This invention relates to signaling systems and particularly to loaded submarine cable telegraph systems.

A general object of this invention is to improve the operation of signaling systems of the type adapted for use with permalloy loaded submarine cables.

A specific object is to increase the speed at which messages may be transmitted from one station to another over long loaded submarine telegraph cables.

Another object is to adapt low speed operating devices to a high speed signaling system wherein low speed transmission lines may be interconnected with a high speed transmission system so as to take full advantage of the maximum speed of the high speed line.

Still another object is to make immaterial the difference of speeds between low speed operating devices and high speed operating devices, respectively located at opposite ends of a signaling system.

The development of the highly permeable magnetic materials of nickel and iron for loading long submarine telegraph cables has made it possible to provide a long submarine cable having electrical characteristics which permit signaling thereover at considerably greater speeds than heretofore used on cables of equal length. However, at the higher ranges of operating speeds, the duplexing of such cables presents difficulties which have been avoided by adapting the simplex or one-way method of transmission with periodic reversals of the direction of transmission. This method was employed in the system which is disclosed in U. S. Patent No. 1,689,328, granted to A. M. Curtis, on October 30, 1928. The apparatus therein disclosed is arranged for five-channel operation and is capable of operating satisfactorily at a speed slightly in excess of 1600 characters per minute.

The system of the present invention comprises a submarine cable arranged in two sections and relates, in part, to an improvement over the system disclosed in the Curtis patent whereby a transmission speed in excess of 2400 characters per minute is attained.

This increase in speed is obtained by providing an eight-channel system wherein vacuum tube transmitters of the type disclosed in the Patent No. 1,763,880, granted to E. T. Burton, on June 17, 1930, and vacuum tube repeaters of the type disclosed in the copending application of A. A. Clokey and E. T. Burton, Serial No. 304,856, filed September 10, 1928, are employed at the repeating stations.

In the complete system, herein described by way of example and illustrated in the accompanying drawings, six stations are employed, two terminal stations and four relay or repeating stations. The submarine cable consists of two sections which are interconnected at one repeating station. Two other repeating stations are located at opposite ends of the cable. The use of these repeating stations at the opposite ends of the cable is desirable since the terminal stations are located at a considerable distance from the landing places of the submarine cable, the distance at one end being so great that an additional repeating station is required to regenerate the signals for further transmission. For transmitting in one direction, say from west to east, the arrangement briefly is as follows: Eight tape-controlled transmitters are successively associated by a multiplex rotary distributor with the land line leading to a repeating station at one end of the submarine cable. Here the transmitted signals are impressed on a vacuum tube transmitter wherein they are amplified and passed to the submarine cable through a sending network which shapes them. At the repeating station which interconnects the two sections of cable, the signals are received in a shaping network having a high impedance with respect to the cable, the network being coupled by a transformer to a shaping amplifier of the type disclosed in Curtis U. S. Patent 1,673,042, June 12, 1928. In the output circuit of the amplifier is a relay which reproduces the signals for monitoring purposes. In the circuit for the reproduced signals is a vibrating relay circuit for interpolating unit impulses lost during transmission and a corrector circuit for maintaining the monitoring distributor in synchronism with the distributor at the sending terminal. Connected across the output circuit of the amplifier is a circuit including a sending distributor connected to a floating transmitter which may be connected to any channel outgoing from such distributor. The channel selected for the floating transmitter may be inserted to take the place of any of the incoming channels whereby the signaling impulses of the channel replaced, are suppressed and the signals of the substituted channel permitted to pass to a vacuum tube repeater and shaping circuit to the second section of the cable. The circuit for suppressing or terminating a message on a channel at a repeating station and substituting in its place another message over the corresponding channel extending to the receiving terminal, is disclosed in a copending application of A. A. Clokey and E. T. Burton, Serial No. 304,856, supra. The signals are received at the terminating end of the second section of the submarine cable in a shaping network which is coupled by a transformer to a second multi-stage amplifier. In the output circuit of the second amplifier are two relays. One of these relays reproduces signal impulses which are passed through a vacuum tube impulse lengthener circuit of the type disclosed in U. S. Patent No. 1,722,050, granted to W. A. Knoop on July 23, 1929. This circuit comprises an eight-channel receiving distributor which causes the successive operation of eight tape-reperforators. The tapes perforated in accordance with the incoming messages, are respectively fed into eight transmitters for repeating message impulses. The odd and even numbered transmitters are in turn connected, respectively, to two four-channel distributors which are arranged to operate at approximately the speed of the eight-channel distributors. The other relay of the output circuit of the amplifier serves to correct for synchronism in a manner described in detail in the U. S. Curtis Patent 1,689,328, supra. The two four-channel distributors in turn, respectively, transmit the impulses to two duplex lines extending to a distant terminal station, the speed of signaling over each duplex line being approximately one-half the speed of signaling over the cable sections. Intermediate the ends of the duplex lines is a repeating station employing vacuum tube repeaters which amplify the signals to produce a satisfactory record on the printers at the receiving terminals.

After transmitting for a predetermined time, a series of contacts in circuits of the type disclosed in U. S. Patent No. 1,753,345, granted to W. A. Knoop on April 8, 1930, are closed which set in motion means for automatically reversing the direction of transmission. Time operated devices are provided at the west terminal station and the repeating stations connected to the cable, but the switching at the stations connected to the duplex lines is effected by means of a pilot line operated by the time operated device at the repeating station at the east end of the cable. In changing the direction of transmission the amplifier is connected in circuit necessarily at several points in the amplifier in order to prevent harmful effects in the amplifier. The arrangement of apparatus for transmission from east to west differs from that above in that no impulse lengthener circuit is necessary at the receiving end of the cable. The signals received at the receiving end of the cable are passed through other shaping networks and amplifiers to the receiving distributor at the station which was previously sending.

The eight-channel distributors which are located at the west terminal station and the repeating stations connected to the cable, are maintained in synchronism by means of the signal impulses, but the four-channel distributors located at opposite ends of the duplex lines are synchronized by impulses sent over a pilot line from the repeating station at the east end of the cable.

A clearer understanding of the invention will be gained from a consideration of the following detailed description together with the appended drawings in which:

*In general*

Figs. 3, 4, 5, 7 and 8 show the equipment at the west terminal.

Fig. 6 shows the equipment at the west repeating station.

Figs. 9 to 15, inclusive, show the equipment at the central repeating station.

Figs. 16 to 21, inclusive, show the equipment at the east repeating station.

Fig. 22 shows the equipment at the east inland repeating station.

Figs. 22—A, 23 and 24 show the equipment at the east terminal station.

Figure 1:
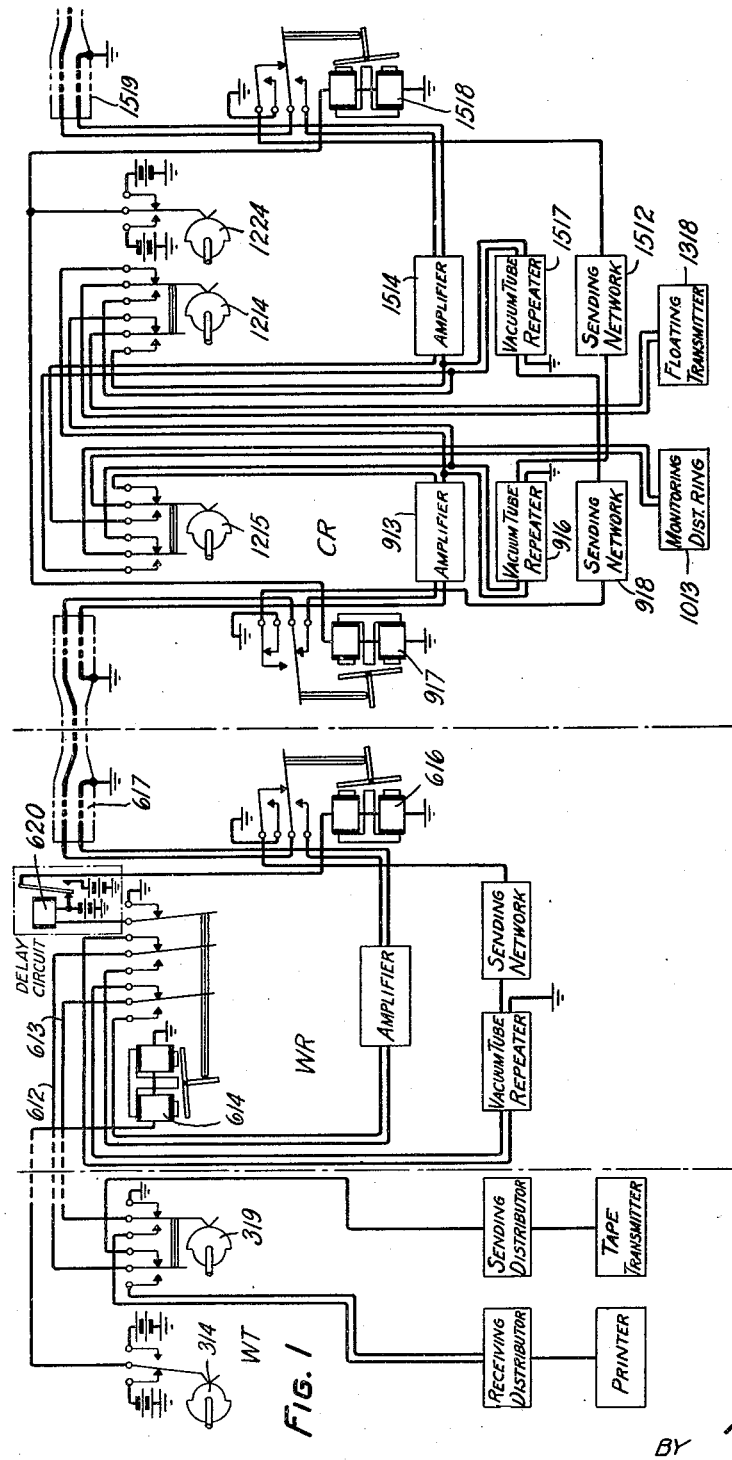
Figs. 1 and 2 show a schematic diagram of the complete system which comprises a terminal station WT; a repeating station WR at the west end of the cable; an intermediate repeating station CR interconnecting two sections of the cable; a repeating station ER at the east end of the cable; an inland repeating station EIR and a terminal station ET at the east end of the system.
Figure 2:
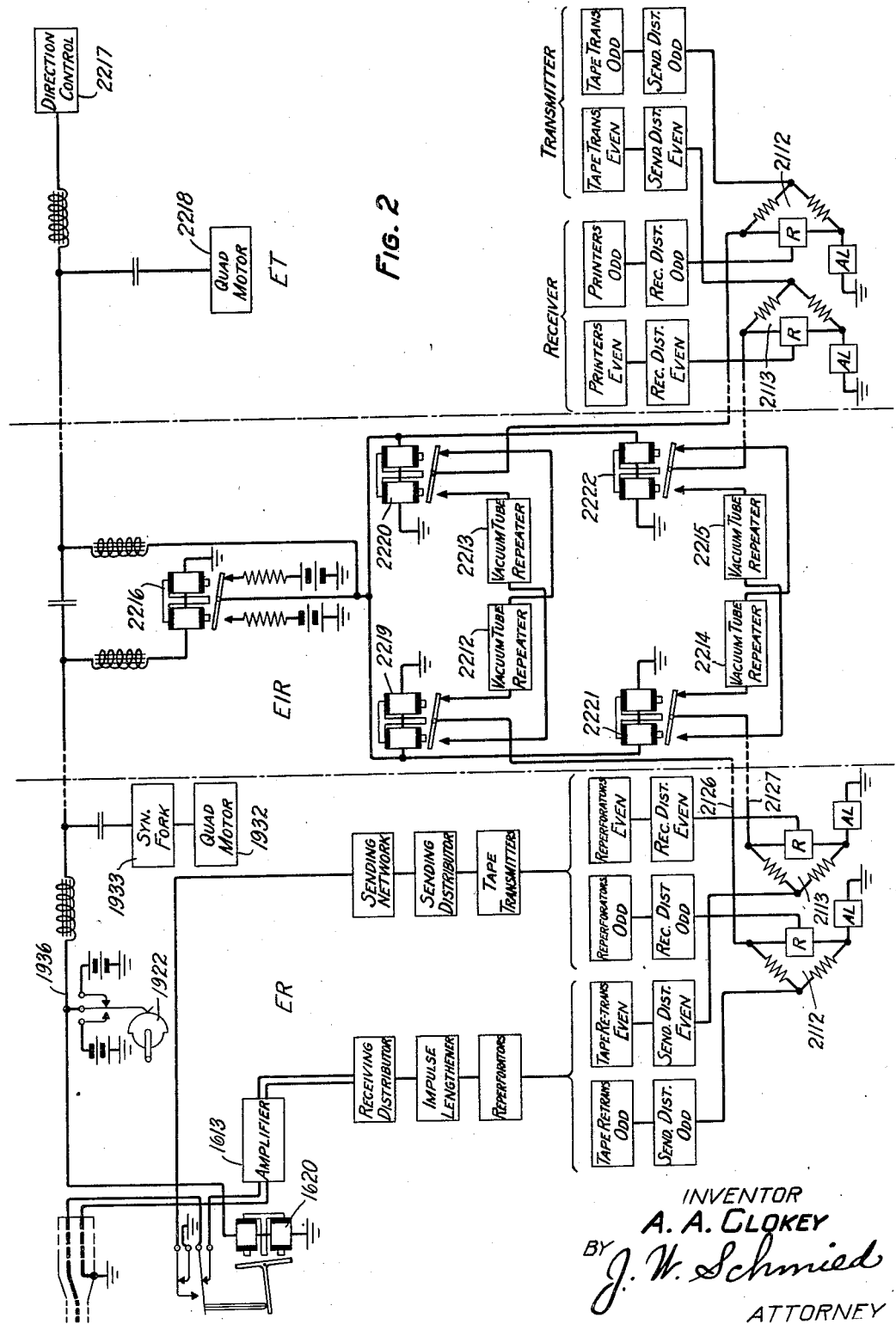

Fig. 25 shows the arrangement of sheets of Figs. 1 and 2 which constitute the schematic layout.

Fig. 26 shows the arrangement of sheets of Figs. 3 to 24 which constitute the detailed layout.

*More specifically*

Figure 3:
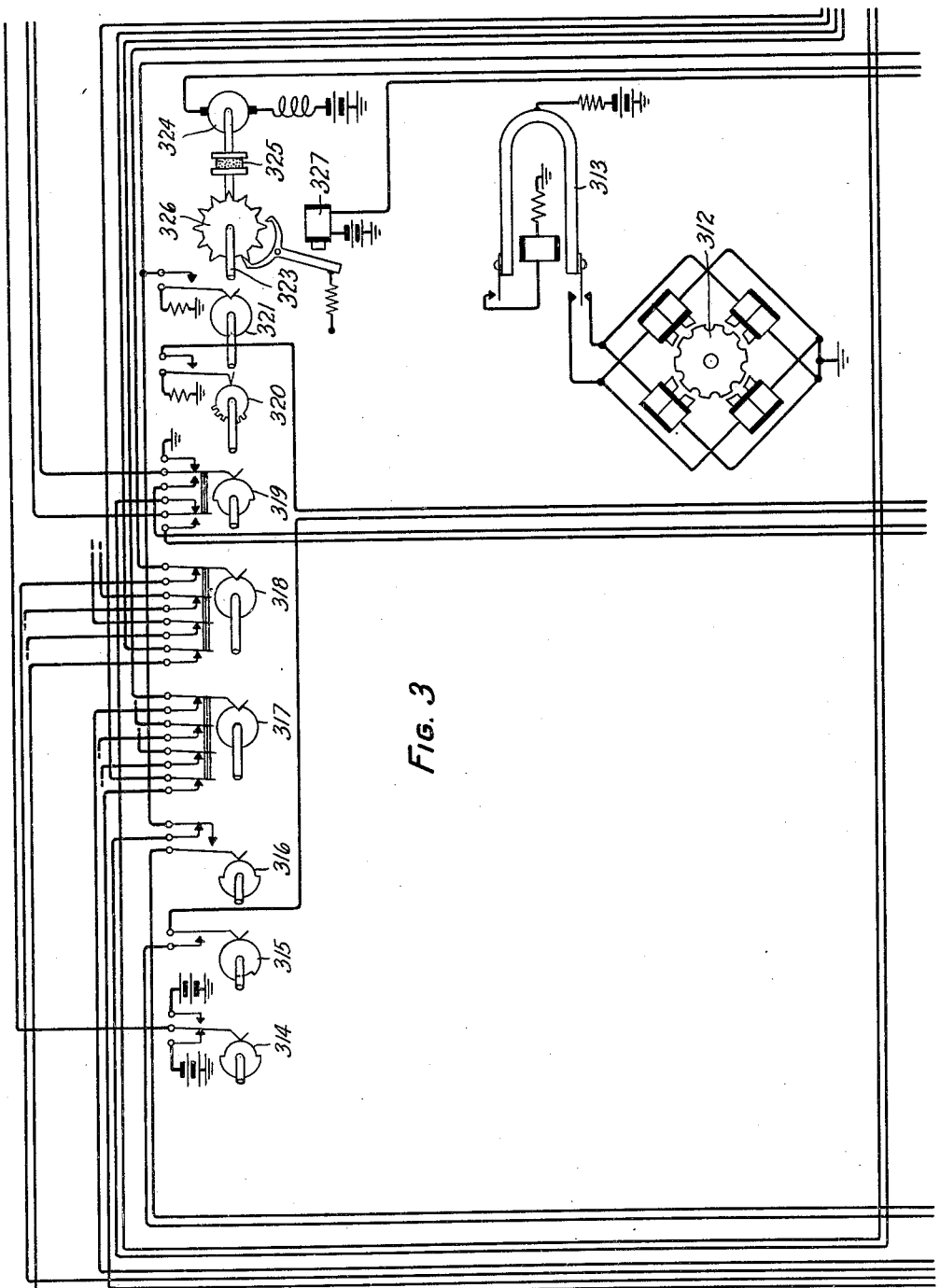

Fig. 3 shows the switching mechanism for rearranging the circuits when a change is to be made from sending to receiving and vice versa.

Fig. 4 shows a portion of the receiving distributor at the west terminal station together with a schematic showing of the receiving printers.

Fig. 5 shows the rings on the receiving distributor which control the vibrating relays together with a schematic showing of the correcting apparatus.

Fig. 6 shows portions of the receiving amplifier and the signaling and the synchronizing relay circuits employed for east to west transmission, and a vacuum tube repeater for west to east transmission.

Fig. 7 shows a portion of the sending distributor together with transmiters schematically illustrated.

Fig. 8 shows the correcting rings on the sending distributor. Timing cams for initiating the transfer from receiving to sending and vice versa are also shown.

Fig. 9 shows the amplifier, signal relay, synchronizing relay and vacuum tube repeater of the central repeating station for west-east transmission.

Fig. 10 shows a portion of the receiving distributor at the central repeating station with the printers indicated schematically, arranged to monitor the transmission in either direction.

Fig. 11 shows the vibrating relays, vibrating relay rings and correcting mechanism at the central repeating station, which are common to the circuit arrangements provided for transmission in either direction.

Fig. 12 shows a switching mechanism for rearranging the circuits at the intermediate repeating station when a change is to be made from sending to receiving and vice versa.

Fig. 13 shows a sending distributor ring and a floating transmitter arranged to be connected to any desired channel at the central repeating station when transmitting in either direction.

Fig. 14 shows the correcting rings of the sending distributor at the central repeating station. Timing cams for initiating the transfer from receiving to sending and vice versa are also shown.

Fig. 15 shows the amplifier and the vacuum tube transmitter, in diagrammatic form at the intermediate repeating station. The signal and the synchronizing relays are also shown. This equipment is used when transmitting from east to west.

Fig. 16 shows the amplifier, vibrating relay circuit and corrector circuit in diagrammatic form at the east repeating station. The signaling and the synchronizing relays are also shown. This equipment is utilized for west-east transmission.

Fig. 17 shows the receiving distributor rings connected through impulse lengthener circuits to reperforators at the east repeating station, which equipment is utilized for west-east transmission.

Fig. 18 shows the sending rings of two four-channel distributors arranged to send the signals received from the reperforators in Fig. 17 over two duplex lines extending to the east terminal station. The sending rings of the four-channel distributors are connected to separate sets of transmitters as shown.

Fig. 19 shows the switching mechanism at the east repeating station for rearranging the circuits thereat when a change is to be made from sending to receiving and vice versa. Separate driving equipment for the eight-channel and the four-channel distributors at the east repeating station are also shown.

Fig. 19—A shows a portion of the correcting rings connected to the corrector mechanism shown diagrammatically in Fig. 16. Also Fig. 19—A shows the switching arrangement for the timing circuit mechanism at the east repeating station.

Fig. 20 shows the sending distributor rings and associated transmitters at the east repeating station for sending during east-west transmission signals received from the duplex lines.

Fig. 21 shows the receiving rings of the two four-channel distributors arranged to receive signals from the duplex lines and to cause the operation of reperforators for east-west transmission.

Fig. 22 shows two one-way vacuum tube repeaters connected at the east inland repeating station in each of the two duplex lines.

Fig. 22—A shows the driving equipment for the distributors at the east terminal station.

Fig. 23 shows the receiving rings of two four-channel distributors together with their respectively associated sets of printers at the east terminal station.

Fig. 24 shows the transmitting rings of two four-channel distributors at the east terminal station together with their respectively associated transmitter sets.

The schematic drawings of Figs. 1 and 2 sets forth the inter-relation of the elements of the system briefly described above. At a given instant a tape transmitter at station WT will be associated by the sending distributor with the land line conductors 612 and 613, through contacts of transfer cam 319. At the same instant transfer cam 314 connects negative battery to the windings of transfer relay 614 at station WR which relay operates and connects the conductors 612 and 613 to a vacuum tube repeater. The operation of relay 614 causes transfer relay 616 to operate through the contacts of relay 620. The vacuum tube repeater is connected through a sending network and the contacts of relay 616 to the cable 617. Simultaneously with the positioning of cams 314 and 319 at station WT cams 1214, 1215 and 1224 at station CR are positioned for west-east transmission, cam 1224 connecting positive battery to the winding of transfer relay 917 which operates and connects over the contacts thereof, cable 617 to amplifier 913. Amplifier 913 is connected over the contacts associated with cam 1215 to a monitoring distributing ring 1013 whereby the incoming signals are recorded for monitoring purposes. In parallel with the monitoring distributing ring to amplifier 913 is a vacuum tube repeater 916 for repeating the signals for further transmission. Across the input circuit of the vacuum tube repeater and through the contacts associated with cam 1214 is a floating transmitter arranged to be connected to any channel of the system and to transmit signals which will predominate over those simultaneously received from the output circuit of amplifier 913, thereby replacing those transmitted from station WT. Cam 1224 also connects positive battery to the windings of transfer relay 1518 in parallel with the windings of transfer relay 917 and the operation of relay 1518 connects vacuum tube repeater 916 to cable 1519 through sending network 1512 and the contacts of relay 1518. Cam 1922 at station ER is positioned simultaneously with the cams at stations WT and CR to connect positive battery to the windings of transfer relay 1620 which when operated by positive current connects the cable 1519 through the relay contacts to the amplifier 1613. Amplifier 1613 is connected to the receiving distributor, impulse lengthener circuit and a reperforator in series, the impulse lengthener circuit being provided to lengthen the impulses sufficiently to operate the slow acting reperforator. In the system shown herein there are eight channels, each requiring a reperforator and these reperforators are provided to operate two sets of tape transmitters which are respectively connected to two duplex lines, the odd numbered transmitters being connected to duplex line 2112, through a four-channel sending distributor and the even numbered transmitters being connected to duplex line 2113 through another four-channel sending distributor. Connected in parallel with the circuit for operating transfer relay 1620 is a pilot line 1936 extending to stations EIR and ET and serving to operate both transfer relay 2216 at station EIR and the direction control apparatus at station ET to their positive positions. The operation of relay 2216 to its positive position sets the relays 2219 and 2220 to positions whereby vacuum tube repeater 2212 is connected for operation in duplex line 2112 and relays 2221 and 2222 to positions whereby vacuum tube repeater 2214 is connected for operation in duplex line 2113. The operation of direction control apparatus 2217 to its positive position disconnects the transmitting equipment at station ET from the duplex lines and the two sets of printers at station ET are under the control of repeaters 2212 and 2214 respectively. Therefore, the odd numbered printers at station ET are connected to duplex line 2112 through one four-channel receiving distributor and the even numbered printers are connected to duplex line 2113 through the other four-channel receiving distributor. The driving mechanisms for the four-channel distributors at stations ER and ET comprise impulse motors 1932 and 2218 respectively. The motor at station ER is driven by a tuning fork 1933 which is tuned to about the frequency of the forks employed for driving the motors used to operate the eight-channel distributors connected to the cables 1519 and 617 and line conductors 612 and 613. The current reversals effected by tuning fork 1933 are sent over pilot line 1936 to operate the motor 2218 at station ET.

After messages have been transmitted in this direction for a predetermined length of time the timing apparatus at each station which is set to measure the same time interval will cause the cams 314, 319, 1215, 1214, 1224, and 1922 to make a half revolution. Transfer relays 614, 616, 917, 1518, 1620 and 2216 and the direction control apparatus at station ET will therefore be operated to their opposite or negative positions to permit transmission in an east-west direction. In this new position the direction control apparatus 2217 at station ET connects the odd numbered transmitters at station ET to duplex line 2112 and the even numbered transmitters to duplex line 2113, the connection of each set of transmitters being effected through a four-channel sending distributor. The operation of relay 2216 to its negative position sets relays 2219 and 2220 in positions whereby vacuum tube repeater 2213 is connected for operation in duplex line 2112 and sets relays 2221 and 2222 in position whereby vacuum tube repeater 2215 is connected for operation in duplex line 2113. The messages are received at stations ER over the two four-channel duplex lines and repeated to two sets of reperforators through two four-channel receiving distributors. The tapes of the reperforator are fed to individual transmitters which transmit signals to the cable 1519 through a sending distributor and sending network in series, the sending distributor being arranged to receive the signals alternately from the odd and even numbered channels. The signals in cable 1519 are received in amplifier 1514, repeated in vacuum tube repeater 1517 and impressed on cable 617, through sending network 918, the floating transmitter 1318 and monitoring distributor ring 1013 being connected as described above over the contacts of cams 1214 and 1215 in their new positions. The signals impressed on cable 617 are received and amplified at station WR for transmission over line conductors 612 and 613 to the receiving distributor and printer at station WT. The nature and operation of the various parts of the system will be clearly understood from the following detailed description.

Description of the Apparatus

*Apparatus in general*

In general, the apparatus at the terminal stations consists of eight transmitters and eight receivers, with two sets of commutators or distributors for directing the signals to the printers and collecting them from the transmitters. Auxiliary apparatus is provided for synchronizing the distributors and for automatically reversing the direction of transmission.

The high speed at which signals may be transmitted over these permalloy loaded cables permits the use of a number of sets of standard type printing telegraph transmitters and receivers operated multiplex. These transmitters and receivers are well known in the art and have been indicated schematically. Each receiver or printer comprises five magnets, one for each impulse of the five pulse code employed, which, when operated in accordance with the code, selects means for printing the corresponding characters, and another magnet for advancing the printing surface to receive the next character and releasing the printer. Each transmitter comprises means such as a perforated tape for controlling the application of the particular combination of potentials on five outgoing conductors to represent the code corresponding to the character to be transmitted, and a magnet for wiping out the setting and advancing the tape for the next character.

The distributors are of a type well known in the multiplex telegraph art, comprising a plurality of concentric rings generally arranged in pairs, each of which has one solid and one segmented ring. A conducting brush mounted on a rotatable arm makes electrical contact between the rings of a pair. The segmented rings of the distributors employed in the high speed section of the system are divided into eight sections or channels, one for each printer or transmitter, and each channel is further sub-divided according to the functions to be performed, usually into five sub-sections, one for each element of the code. In the low speed section of the system wherein the two duplex lines are employed the rotary distributors are substantially the same except that the segmented rings thereof are each divided into four sections or channels.

*Apparatus at the west terminal station*

At the west terminal two distributor faces are provided, whereof rings 429 to 434, inclusive, and 512 and 513 appear on one face, which will be called the receiving distributor, and rings 720 to 725, inclusive, and 812 and 813 appear on the second face, which will be called the sending distributor. Brushes 435 to 437 and 514 serve the receiving distributor, while brushes 726 to 728 and 814 serve the sending distributor. All the brushes are driven from one shaft.

Rings 429 and 430 of the receiving face distribute the incoming signals to the printers 412 to 419; rings 431 and 432 operate the magnets 420 to 428 which control the printing operation; rings 433 and 434 close one part of the timing circuit; rings 512 and 513 cooperate with vibrating relays 515, 516 and 517 to reproduce the signals transmitted by a distant station. The general operation of the vibrating relays will be described later, but for a detailed discussion, reference may be made to U. S. Patent No. 1,680,550 granted to M. B. Kerr, August 14, 1928.

On the transmitting distributor, rings 720 and 721 transmit the signals from the tape-controlled transmitters 712 to 719; rings 722 and 723 operate the magnets of transmitters 712 to 719; rings 724 and 725 close one part of the timing circuit; rings 812 and 813 cooperate with corrector relays 518 and 519 to bring the distributor brushes into synchronism with those at the distant stations when one of the distant stations is sending.

The driving mechanisms for both the brushes and the timing mechanism may comprise an impulse motor, or phonic wheel 312, which is arranged to be rotated in a well known manner by the vibration of fork 313. The impulse motor is mounted directly on the drive shaft of the distributor brushes.

Since it is difficult to adjust two tuning forks to vibrate at exactly the same rate, the fork at one station, in this case the west terminal station, is adjusted to vibrate at a slightly higher rate and means is provided for frequently adjusting the position of the brushes at the repeating and the receiving stations under the control of the sending station. The method used is that usually known as "clockhand" correction. The mechanism for making this correction at the west terminal station, when receiving, is shown in Fig. 5. Shaft 520 is driven by motor 312 and by means of the differential bevel gears 521, drives shaft 522 which carries the brushes. The corrector magnets 523 and 524 act upon gears 521 by means of gear 525 and worm 526. The operation of either magnet 523 or 524 rotates the worm 526 and shifts the angular position of the brush shaft 522 with respect to the motor shaft 520. The stroke of magnet 523 is restrained by pin 527 and adjustable stop 528 and that of magnet 524 by pin 531 and adjustable stop 532 for accuracy of correction. A description of the control of the corrector magnets will be given later and a more detailed discussion will be found in Patent No. 1,670,461 granted to G. A. Locke, May 22, 1928.

Reversal of direction of sending is controlled by timing cams 815, 816 and 817. These cams are geared to shaft 818 which is driven by the necessary gearing from worm 819, which, in turn, is driven through clutch 820 by a shaft geared to the brush shaft 821. In order that the timing mechanism at all stations may be started at the proper time means are disclosed in the Locke Patent 1,670,461 whereby shaft 818 may be lowered out of engagement with the driving gears of the timing cams without disengaging it from worm 819. Shaft 818 is normally locked in its operative position, but may be readily lowered out of engagement with the driving gears by releasing latch 824 thereby permitting cam 825 to be rotated and effect the disengagement. With the shafts disengaged the timing cams may be set in a predetermined position as indicated by markings on the knobs shown respectively connected thereto. In practice, clutch 820 would then be disengaged and held there by latch 828 under the control of magnet 822. Shaft 818 would then be restored to engagement with the timing cams and the timing operation started by an impulse operating magnet 822 and the corresponding magnets at the cable repeating stations, thus starting the timing at all stations where the eight-channel distributors are employed. In the present disclosure it is assumed that cam 817 makes four revolutions a minute and closes its contact for six seconds; cam 816 makes one revolution a minute and closes its contact for 15 seconds; and cam 815 makes one revolution in 12 minutes and makes two closures of approximately 20 seconds each at 6 minute intervals. Cam 815 is one of a plurality of cams (not shown) rotating on the same shaft and cut to give a number of time intervals. The contact operating arm 826 is movable to cooperate with any one of the cams and vary the relative lengths of the times of transmission in the two directions to accommodate the traffic. Cam 815 provides for 6 minute transmission in each direction. For a complete description of the timing operation together with a special means for starting the timing operation, reference may be made to U. S. Patent No. 1,681,489, granted to G. A. Locke and H. H. Haglund on August 21, 1928.

The actual transfer is brought about by transfer cams 314 to 321, inclusive. These cams are mounted on shaft 323 which is driven by motor 324 through friction clutch 325. The speed of rotation of the shaft is restricted by escapement 326, controlled by magnet 327. The simultaneous closure of cams 815 and 816 completes a circuit for motor 324, and the subsequent closure of cam 817 completes a circuit for magnet 327, through distributor rings 724 and 725 or 433 and 434. As soon as magnet 327 energizes, shaft 323 is permitted to move and cam 321 closes a substitute circuit for magnet 327. Each time that the distributor rotates, magnet 327 energizes and the shaft moves an angular distance measured by one-half tooth on the escapement. As the shaft 323 rotates the cams 314 to 321 open and close circuits bringing about the transfer. When the shaft completes a half revolution cam 321 opens the circuit of magnet 327 and, since cam 817 has now opened its contact, the transfer switch comes to rest until the end of the next time interval. The change-over takes approximately six seconds.

Assuming the transfer switch to be in position for sending, as shown at the west terminal station, as soon as shaft 323 starts to move at the end of the transmitting interval, cams 317 and 318 will open one winding of each of the differential relays 729 to 736, inclusive, causing these relays to operate and lock the magnets 737 to 744, respectively, each of which advances the tape of a transmitter. After an interval, cam 319 transfers the signal conductors 612 and 613 from the sending distributor to the holding winding of the vibrating relay 515. Cam 320 causes a predetermined number of operations of correcting magnet 523, so that the distributor will be maintained approximately in synchronism with the distant distributor during the period occupied by the change-over, in which no synchronizing message signals may be transmitted or received. Cam 316 transfers the operating circuit of relay 327 from the sending distributor ring 725 to the receiving ring 434. Cam 314 reverses the position of transfer relay 614 so as to disconnect conductors 612 and 613 at station WR from the transmitting equipment and connect them to the receiving equipment. Cam 315 connects the armature of vibrating relay 516 to receiving ring 429.

For the purpose of arranging the channels at the sending and receiving stations so that signals are received over a channel corresponding to the one transmitting, multicontact switches 438 and 745 are provided. Switch 438 substitutes a bank of lamps for the receiving printers and these lamps are lighted in response to impulses sent out at the east terminal station due to the operation of a switch similar to switch 745, which arranges for the transmission of a special code of impulses. This operation is generally known as "phasing" as is described in detail in the U. S. Patent, 1,689,328, granted to A. M. Curtis, on October 30, 1928.

Apparatus at west repeating station

The apparatus at the west repeating station WR comprises a vacuum tube transmitter 615 for west to east transmission and a vacuum tube amplifier 619 for east to west transmission. The transmitter and amplifier at this station are alternately employed to interconnect the land line extending to the west terminal station and the submarine cable extending to the central repeating station CR. Transmitter 615 is of the type disclosed in the copending application of A. A. Clokey and E. T. Burton, Serial No. 304,856, filed September 10, 1928, and amplifier 619, shown diagrammatically, is of the type disclosed in Curtis Patent No. 1,673,042, supra. No rotary distributors are employed at this station and consequently no driving mechanisms are required. The change-over from transmission to receiving and vice versa is effected by transfer relays 614 and 616 of the type disclosed in the U. S. Patent No. 1,753,345, granted to W. A. Knoop on April 8, 1930. These transfer relays are controlled from the timing cam 314 at the west terminal station.

Apparatus at the intermediate repeating station

The apparatus at the intermediate repeating station CR includes two distributors, one comprising rings 1012 to 1017 and 1112 and 1113, the other comprising rings 1312 to 1317 and 1412 to 1413. Rings 1012 to 1017 of the first distributor face constitute the monitoring or receiving distributor which functions to operate printers 1018 to 1025 and rings 1312 to 1317 of the second distributor face constitute a transmitting section provided with a floating transmitter 1318 which is arranged to transmit signals over any channel extending in either direction through this station, thereby suppressing and terminating a message originating at either terminal station on the particular channel. The main driving means for this distributor is a phonic wheel 1212 arranged to be driven at a constant speed by the tuning fork 1213. The frequency of operation of this fork may be made exactly equal to the frequency of the tuning fork 313 at the west terminal station, although it is sometimes desirable, particularly for correction purposes, to have the fork at the sending station vibrate at a slightly faster rate than the forks at the repeating and receiving stations, particularly when the latter stations are at considerable distances from the sending station.

The incoming signals during west to east transmissions are received in the shaping network 912, vacuum tube amplifier 913, signaling relay 914 and synchronizing relay 915 in series connection. Connected across the circuit including the elements just cited is a vacuum tube transmitter of the type disclosed in the copending application of A. A. Clokey and E. T. Burton supra, which is arranged to repeat the reformed signal impulses through sending network 1512 to the outgoing cable. Signaling relay 914 operates in response to the incoming signals, causing the subsequent operation of relay 1114. Should any of the incoming signals be of insufficient intensity to operate relay 914 as is usually the case when signals of unit impulse length are transmitted over a long submarine cable, these impulses are replaced by vibrating relays 1114, 1115 and 1116 which operate in conjunction with distributor rings 1112 and 1113 to produce impulses of alternate positive and negative polarities. Therefore relay 1116 is arranged to reproduce the signals as transmitted from the west terminal station. Synchronizing relay 915 is similarly operated by the incoming signals causing thereby the subsequent operation of corrector relay 1117. Should the distributor at this station be out of synchronism with the distributor at the sending terminal, an operating circuit for auxiliary corrector relay 1118 would be closed through the distributor rings 1412 and 1413. Relay 1118 operates and causes the operation of either corrector magnet 1119 or 1120, depending upon the direction in which the correcting mechanism 1121 should be moved to restore synchronism. The direction of correction is determined by the setting of switch 1122.

The distributor rings 1012 and 1013 direct the code impulses received from the west terminal station, through the operation of relay 1116, to the printers or monitoring devices 1018 to 1025 and a record is taken of all the signals being repeated through the retransmitter 916. To terminate the signals of any one channel at this station, so that the corresponding channel extending to the east terminal may be employed for a message originating in this repeating station, a floating transmitter 1318 is provided and arranged by means of switch 934 to be associated with any of the channels shown in ring 1313. The impulses from this transmitter are impressed across the input circuit of repeater 916 and are of sufficient power to predominate over the incoming signal impulses in the output circuit of amplifier 913. Thus the signal impulses originating in transmitter 1318 are repeated by retransmitter 916 and impressed on the outgoing cable through the sending network 1512 in place of those transmitted from the west terminal station over the channel to which transmitter 1318 may be connected.

The reversal of direction of transmission is controlled by timing cams 1415, 1416 and 1417 in the same manner as described above for Fig. 8. The actual transfer is brought about by transfer cams 1214 to 1226, inclusive. These cams are mounted on shaft 1228 which is driven by a motor 1229 through friction clutch 1230. The speed of rotation of the shaft is restricted by an escapement 1231 which is under the control of magnet 1232. The transfer cams operate in conjunction with the timing cams to effect the switching from sending to receiving and vice versa in much the same manner as described for the west terminal station.

The incoming signals during east to west transmission are received in shaping network 1513, vacuum tube amplifier 1514, signal relay 1515 and synchronizing relay 1516 in series connection. The relays operate in response to the signals received from the east terminal station. The transfer cams in Fig. 12 now being in a position for east-west transmission control the operation of the vibrating relays 1114, 1115, 1116 and the corrector relay 1117, as heretofore described. The operation of the vibrating relays causes the printers or monitoring devices 1018 to 1025 to prepare a record of the signals received from the east terminal station. Connected across the output circuit of amplifier 1514 is a vacuum tube repeater 1517 which is provided to repeat messages in an east-west direction and to permit the termination of the message on any one channel and to substitute in its place for transmission to the west terminal station a message originating in the floating transmitter 1318. The shaping network 1513, amplifier 1514 and retransmitter 1517, shown diagrammatically are respectively similar to shaping network 912, amplifier 913 and vacuum tube repeater 916.

*Apparatus at the east repeating station ER*

The apparatus at this station for west-east transmission comprises a shaping network 1612, vacuum tube amplifier 1613, signal relay 1614 and synchronizing relay 1615 in series connection. The shaping network and amplifier are similar to the corresponding apparatus shown in Fig. 9 and are shown diagrammatically. Signal relay 1614 operates in conjunction with the vibrating relays 1616, 1617 and 1618 and the vibrating distributor rings (not shown) to reproduce the transmitted signals in the same manner as described above in connection with the corresponding apparatus at stations WT and CR. The reproduced signals are impressed over a special set of receiving rings 1712, 1713 and 1714 upon individual impulse lengthener circuits, each comprising a three-electrode vacuum tube having a storing condenser connected in parallel with its grid circuit and a reperforator selector magnet connected in series with its plate circuit, the reperforator magnets being similar to printer selector magnets. The impulse lengthener circuits prolong the high speed signals sufficiently to insure the operation of the slow acting selector magnets 1727, 1728, etc., which may be employed for punching the signal combinations in a tape. The tapes are then respectively fed into a plurality of transmitters which are associated with two low-speed duplex lines interconnecting stations ER and ET. The distributor ring 1712 is divided into eight sections corresponding to the number of channels employed, ring 1713 is continuous and is connected to negative battery, and ring 1714 is divided into eighty alternate live and dead segments. The impulse lengthener circuits for the first channel are connected to the first five live segments of ring 1714 and include the vacuum tubes 1715 to 1719, respectively, and the impulse lengthener circuits for the seventh channel are connected to the seventh group of five live segments of ring 1714 and include the vacuum tubes 1720 to 1724, it being understood that each channel has its separate group of impulse lengthener circuits, as shown diagrammatically by blocks 1725 and 1726. The operation of magnets 1727 to 1731 records the message of the first channel in the reperforator associated with a tape checker 1732 and the operation of magnets 1733 to 1737 records the message of the seventh channel in the reperforator associated with tape checker 1738, it being understood that other reperforators such as those diagrammatically shown by blocks 1751 and 1752 are provided for the remaining channels. The distributor ring 1713 serves to restore the normal grid bias to each of the vacuum tubes 1715, 1716, etc., before the vacuum tube receives another signal. This is accomplished by brush 1753 which is arranged to rotate in advance to brush 1752. A more detailed description of the impulse lengthener circuit may be had by referring to U. S. Patent No. 1,722,050, granted to W. A. Knoop on July 23, 1929.

The reperforators supply the perforated tape through eight tape checkers such as 1732, 1739, 1738 and 1740 to eight tape-operated transmitters 1812 to 1819 which are arranged to transmit the signals received from the eight channel table over two four-channel duplex lines. Therefore the transmitters 1812 to 1819 are arranged in two groups respectively, operating through two four-channel distributors, the connections being established through sending rings 1820 and 1821 of one distributor and sending rings 1823 and 1824 of the other. A suitable grouping of these transmitters may be made in accordance with the odd and even positions of the channels of the eight-channel cable, with which they are associated. Accordingly, transmitters 1812 to 1815, respectively, repeat the signals received from the odd numbered channels to duplex line 2112 and transmitters 1816 to 1819 respectively, repeat the signals received from the even numbered channels to duplex line 2113. The two four-channel distributors are mounted on a common shaft and arranged to operate at about the speed of the eight-channel distributors. Transmitters 1812 to 1819 are respectively associated with cable channels Nos. 1, 3, 5, 7, 8, 2, 4 and 6, transmitters 1812 to 1815 operating simultaneously with transmitters 1816 to 1819 respectively.

The apparatus involved in east-west transmission comprises the two duplex lines 2112 and 2113, in each of which is a relay for receiving the incoming impulses and reproducing them on the receiving rings of one of the two four-channel distributors. The signals incoming over duplex line 2112 are received in relay 2128 and operate through rings 2114 and 2115, reperforators 2118 to 2121 and the signals incoming over the duplex line 2113 are received in relay 2129 and operate through receiving rings 2116 and 2117, reperforators 2122 to 2125. The reperforators, like transmitters 1812 to 1819, are arranged in two groups to correspond with the odd and even channels on the cable and supply tape to their respective transmitters 2020 to 2027 which are in turn connected to the sending rings 2028 and 2029 of the high speed eight-channel distributor. The tapes from reperforators 2118 to 2125 are fed to transmitters 2020 to 2027 through the tape checkers 2012 to 2019 respectively. The tape checkers serve to stop the transmitters operating when the transmitters catch up with the reperforators, thereby preventing the tapes from breaking. The signals transmitted over rings 2028 and 2029 are impressed on cable 1519 through the sending network 1619.

The reversal of direction of transmission is controlled by timing cams in a manner similar to that of the cams described above for Fig. 8, the switch arms 1911, 1912 and 1913 corresponding to the switch arms closed by cams 815, 816 and 817 respectively. The actual transfer is brought about by transfer cams 1914 and 1924. These cams are mounted on shaft 1925 which is driven by motor 1926 through friction clutch 1927. The speed of rotation of the shaft is restricted by escapement 1928 which is controlled by magnet 1929. The driving mechanism for the brushes of the eight-channel distributor and timing mechanism comprises an impulse motor or phonic wheel 1930 which is arranged to be rotated in the well-known manner by the vibration of fork 1931. The driving mechanism for the brushes of the two four-channel distributors comprises an impulse motor or phonic wheel 1932 which is arranged to be rotated by the vibration of fork 1933 which also effects the operation of relay 1934 to its alternate positive and negative positions, thereby producing corresponding alternations in the transformer 1935 to control the driving mechanism at the east terminal station, as will hereinafter be described.

*Apparatus at the east inland repeating station EIR*

The apparatus at the east inland repeating station comprises one-way vacuum tube repeaters 2212 and 2213 in duplex line 2112, and one-way vacuum tube repeaters 2214 and 2215 in duplex line 2113. The vacuum tube repeaters of each line are respectively arranged to repeat in opposite directions, one repeater in each line being connected for operation from the transfer relay 2216 in one position and the other repeater in each line being connected for operation when transfer relay 2216 is in its opposite position. Relay 2216 is under the control of cam 1922 at the east repeating station.

*Apparatus at the east terminal station ET*

The apparatus at the east terminal station comprises two four-channel distributors similar to those described above for the east repeating station and are connected to duplex lines 2112 and 2113. The change in direction of transmission is effected by relay 2217, which like relay 2216 is under the control of cam 1922 at the east repeating station. Relay 2217 effects the operation of relays 2424 and 2425, the latter relays being effective to control the operation of transmitters 2416 to 2419 over duplex line 2113 and transmitters 2420 to 2423 over duplex line 2112.

The driving mechanism for the brushes of the two four-channel distributors may comprise an impulse motor or phonic wheel 2218 which is arranged to operate in response to the operation of relay 2229 which is controlled by the alternating current received from relay 1934 through transformer 1935 at the east repeating station.

TRANSMISSSON DETAILS

*Transmitting*

The signal code employed in modern submarine telegraphy is the "Baudot" or 5-impulse per character code. On sending pulses out over the cable, it has been found that, if the outgoing signal pulses are "curbed", by earthing the cable for a short time between each impulse, the received signals are much less distorted. Curbing is accomplished by dividing into halves the segments of the transmitting ring over which the signal impulses are to be transmitted and supplying the pulse over one-half and ground over the other. Rings 721, 1313, 1821, 1824, 2029, 2413 and 2415 are cut in this manner.

Not only are the signals "curbed" by the distributor segments in this manner, but the outgoing signals are transmitted through a sending "shaping" network. The sending network at the west end of the cable comprises a condenser 621 shunted by a variable resistance 622 together with an impedance 623 in series with condenser 624 connected between the cable terminal and ground. Impedance 623 has a low value as compared with the characteristic impedance of the cable, while the capacity of condenser 624 is so large that it has little influence on the action of an impedance 623 at any but the extremely low frequency components of the signals. This sending network and the operation thereof is disclosed in greater detail in U. S. Patent No. 1,624,396, granted to A. M. Curtis on April 12, 1927.

Reception

The signals as received are feeble and distorted, taking the form of undulated rounded waves unsuitable to directly operate relays to reproduce the signal impulses. Also, when impulses of one polarity preponderate, the received current of that polarity will grow larger and larger, while those of the opposite polarity will appear as slight ripples on the preponderating current, giving the effect known as "zero wander". The receiving equipment should, therefore, include means for amplifying and shaping the incoming signals and for correcting the bias or "zero wander". The means for amplifying and shaping have been disclosed in detail in Fig. 9. The shaping and amplifying means are described in detail, as stated above, in Curtis Patents 1,624,396 and 1,673,042. The means for correcting the bias or zero wander have not been shown inasmuch as it may be conveniently supplied by reference to prior publications, i. e., Curtis U. S. Patent No. 1,689,328.

A description of the transmission and reception will be given hereinafter under "Operation of the system".

Synchronous relay operation

Associated with the receiving circuits at stations WT, CR and ER are vibrating relay circuits which are employed to permit a greater speed of transmission. The vibrating relay circuits are shown in Figs. 5, 11 and 16 and by means of these circuits, signaling may be carried on at a speed greater than the maximum at which the cable will transmit reversals of unit length impulses. The circuit arrangement shown in Fig. 5 will be described somewhat in detail which will suffice for the arrangements shown in Figs. 11 and 16. For a more detailed description reference may be had to Patent No. 1,680,550, granted to M. B. Kerr on August 14, 1928. When signal relay 626 responds to the incoming signals, relay 515 operates accordingly. Relay 515 is to provide for the insertion in the received signals of the unit length current impulses that have been lost during transmission over cable 617. Cooperating with relay 515 are auxiliary relay 517, printer relay 516 and distributor rings 512 and 513 which are interconnected by brush 514.

Pulses of unit length received over cable 617 during east-west transmission are greatly attenuated and therefore fail to operate relay 626, which normally closes either contact; pulses made up of two or more pulses of the one polarity will cause relay 626 to close a contact of corresponding polarity. The armatures of relays 515, 517 and 516 each remain in either closed position until reversed by current of opposite polarity. When no signals are being received or relay 626 is not operated due to the reception of positive or negative impulses of unit length, the auxiliary vibrating relay 517 is operated through rings 512 and 513 from contacts of relay 515, closing a circuit for vibrating relay 515 through its right hand or vibrating winding, over alternate segments of rings 512 and 513 to battery through a contact of relay 515 which circuit causes relay 515 to close its opposite contact. A circuit will be closed over the next segments of rings 512 and 513 to reverse the armature of relay 517, and over the following segments to reverse the armature of relay 515. Relay 516 operates directly from the contacts of relay 515 and applies potentials to ring 429 through the contacts of cam 315 for distribution to the printers 412, 413, etc. When no signals are being received the armatures of relays 515 and 517 will therefore vibrate between their respective contacts and will cause printer relay 516 to operate the printer magnets as though alternate positive end negative pulses of unit length were being received.

The circuit through the left hand or "holding" winding of relay 515 is completeted at the contacts of signal relay 626. The strength of the currents through the holding and vibrating windings of relay 515 is adjusted so that relay 515 will follow the operations of the signal relay irrespective of the polarity of the current which may be received in the vibrating winding. Thus when an impulse of two or more units in length causes the operation of relay 626, relay 515 will be operated in the corresponding manner and auxiliary vibrating relay 517 will remain operated in the position in which it was previously set, this position being the same as that assumed by relay 515. If this impulse is followed by one or more unit-length impulses, no current will be received in the holding winding of relay 515 and the relay will reverse its armature on the next closure of the circuit through its vibrating winding, which will occur in synchronism with the incoming impulses. Printer relay 516 will therefore operate to record a unit-length pulse of opposite polarity. A second unit-length pulse will again result in no current being received in the holding winding of relay 515, the reversal of the relay armature, and the printing of a unit-length pulse of a polarity opposite to that just previously recorded. The active segments of ring 512 are separated by narrow dead segments which prevent short circuiting the armatures of relays 515 and 517.

*Synchronization*

Means are provided at stations WT, CR and ER for correcting the cable or eight-channel distributors for synchronism, the corrector mechanisms being shown in Figs. 5, 11 and 16, although in the latter figure the mechanism is shown diagrammatically. A more detailed description of the correcting means may be had by reference to Patent No. 1,670,461, granted to G. A. Locke, May 22, 1928. The arrangement shown in Fig. 5 will be described in a general way and will be regarded as representative of the arrangement shown in Figs. 11 and 16. Synchronizing relay 629 is arranged to respond with signal relay 626 to the incoming signals of two or more units length and like relay 626 is adapted to remain in either operated position. It reverses the position of its armature with each reversal of the incoming signals. These reversals of polarity occur at the beginning of a signal and therefore occur, when the distributor is in synchronism, as the brushes encounter the first distributor segment over which the signal is to be received. The operation of relay 629 causes corresponding operations of relay 518, which in turn control a circuit over rings 812 and 813. Ring 812 is solid, but ring 813 is divided into 80 segments, two for each impulse. The first segments of these pairs are strapped together and connected to ground through resistance 823. The second segments are strapped together and connected to the winding of auxiliary corrector relay 519.

When relay 518 closes its right hand contact, condenser 529 is charged from battery through the resistance 530. When relay 518 closes its left hand contact, condenser 529 is discharged through distributor rings 812 and 813 and thence through resistance 823 or the winding of relay 519. With the cable distributor running in exact relative synchronism, taking into acount the cable lag, brush 814 will make contact with the first segment of a signal pair at the time relay 518 closes its left hand contact and condenser 529 will discharge through resistance 823.

As stated, the distributor at station WT may be adjusted to run slower than those at stations CR and ER. If the distributors are so arranged the brushes, such as brush 814, will therefore lag behind the incoming signals so that brush 814 will, after an interval, be still in contact with a second segment when relay 518 operates due to an incoming signal. Correction will have to be in a forward direction and therefore switch 533 will be in a position opposite to that shown. The circuit will then be closed through relay 519 and the relay in turn will close a circuit for corrector magnet 524. The operation of magnet 524 steps the brush shaft forward so that the brush 814 again makes contact with the first segment at the time a reversal is received. It also closes a circuit for auxiliary corrector relay 519 which restores the latter relay to its normal position, thus opening the corrector magnet circuit. For backward correction switch 533 is operated to the position shown, thereby disconnecting magnet 524 and connecting in its place magnet 523.

OPERATION OF SYSTEM

*Preparatory adjustments*

In preparing the system for transmission after a period of non-use a series of adjustments are made with timed intervals allotted for each adjustment. Assuming that transmission is to be in the west-east direction, the first adjustment is, of course, that of the speed of the distributor at station WT, which is accomplished by adjusting weights provided for that purpose on fork 313. Similarly the speed of the cable distributors at stations CR and ER is controlled by adjusting weights provided for that purpose on forks 1213 and 1931. These weights may be so adjusted that the fork at station WT vibrates at a slightly faster speed than the forks at stations CR and ER.

The next step is to start the distributors operating in phase and this is done by moving the switch 745 to the right whereby certain sending segments of ring 721 are disconnected from their respectively associated transmitters and connected to batteries of a polarity opposite those normally connected. In Fig. 7 the third segments of the first two channels are shown respectively connected to negative and positive battery when switch 745 is moved to its operated position. This is in accordance with the practice of having the transmitter contacts of the odd numbered channels normally connected to positive battery and those of the even numbered channels normally connected to negative battery. Although for the purpose of the description it is assumed that only one phasing impulse for each revolution of the distributor is transmitted from station WT, this impulse being the third in the first channel. The attendant at station CR operates key 1026, connecting a series of lamps to the receiving segments of ring 1013. These lamps are numbered in accordance with the segments of ring 1013 to which they are connected. Ordinarily at each revolution of the distributor at station WT, five positive spacing and five negative spacing impulses would alternately be sent out from transmitters 712, 713, etc., but now, during the phasing period, the third spacing impulse in the first channel becomes negative, while the spacing signals of the remaining channels remain the same as in ordinary practice. These impulses are transmitted over rings 721 and 720, inner left contact of cam 319, conductor 612 of the land line, the right contact of the middle armature of relay 614, through the vacuum tube repeater 615, sending network 618, middle contact of relay 616, over conductor 923 of cable 617, lower contact of relay 917, through anti-resonant network 926, shaping network 912, amplifier 913, through the windings of synchronizing relay 915 and signal relay 914 to ground on sea earth return cable 936. The impulses of each channel will be received in relay 914 as long pulses, the impulses in the first channel appearing as two two-unit pulses of positive current and those in the remaining channels as single five-unit pulses of alternate positive and negative current. Signal relay 914 will operate to either of its contacts in response to the long pulses. The impulses repeated by relay 914 are transmitted over the inner left contact of cam 1215, through the left hand winding of vibrating relay 1114, back through the outer right contact of cam 1215 to either side of battery connected to the contacts of relay 914. The operation of relay 1114 completes through either of its contacts a circuit through the windings of relay 1116 which operates and connects positive or negative battery in accordance with the polarity of the received signals, in a circuit extending over the closed contacts of cam 1222, ring 1012, brush 1027, ring 1013 and the lamps connected to ring 1013 by key 1026. If the distributor brushes are in phase, brush 1027 in rotating over the segments of the first channel will connect positive battery to the first, second, fourth and fifth lamps and negative battery to the third lamps, and in rotating over the segments of the remaining channels alternate negative and positive battery will be connected to each succeeding group of five lamps. The lamps are connected on the other side to positive battery 1028. Therefore only those lamps to which negative pulses are directed will be lighted during the revolution of the distributor brush 1027. Brush 1027 is differentially coupled to the drive shaft so as to be capable of manual adjustment relative thereto without interfering with the driving. Should the lamps show that the brushes are out of phase, brush 1027 would then be adjusted until lamps Nos. 3, 6 to 10, 16 to 20, 26 to 30 and 36 to 40 are lighted once per revolution. The pulses are then being received at repeating station CR in the same order and relation as they are sent out from station WT. The attendant at station CR then restores switch 1026.

The impulses which operate relay 914 also flow through repeater 916, conductor 935, sending network 1512, middle contact of relay 1518, conductor 1520 of cable 1519, lower contact of relay 1620, shaping network 1612, amplifier 1613, windings of relays 1615 and 1614 in series back to sea earth. Relay 1614 repeats the impulses through the left hand winding of relay 1616 of the vibrating relay circuit and relay 1616 operates, causing a corresponding operation of printer relay 1618. The attendant at station ER by operating switch 1754 connects lamps to the receiving segments of ring 1714. Relay 1618 of the vibrating relay circuit repeats the incoming impulses of positive and negative polarity as impulses of positive polarity only, because of the use of vacuum tubes 1715, 1716, etc. in the impulse lengthener circuit in the manner described in detail in U. S. Patent No. 1,722,050, granted to W. A. Knoop on July 23, 1929. Consequently the phasing arrangement at station ER is different from that shown for station WR. The principal differences found in the arrangement at station ER are (1) the receiving distributor comprises three rings, the extra one designated 1712 in Fig. 17, being divided into eight segments to correspond to the number of channels; (2) these segments are interconnected to form two groups of alternate segments; (3) the armature of relay 1618 is connected to positive battery when cam 1914 is in position for west-east transmission; (4) the contacts of relay 1618 are respectively connected to the two groups of segments of ring 1712, the segments of the first, third, fifth and seventh channel being connected to the left hand contact and those of the second, fourth, sixth and eighth channels being connected to the right hand contact; and (5) the lamps are connected on the other side of their operating circuit to negative battery. Should all the phasing impulses of each channel be of the one polarity, the armature of relay 1618 in response to these impulses, would so position itself as to open all the operating circuits of the lamps successively and no lamp would light, or would so position itself as to light all lamps. This would indicate any difference of phase of the brushes within a channel but should the difference in phase be two, four or six channels the same conditions would exist. That is, no lamps would light and the indication would therefore be incorrect. In order to insure the correct indication the polarity of the third impulse of the first channel is reversed at station WT as stated above, and consequently if the brushes are in phase the third lamp in the first channel at station ER will light every time the distributor brush passes over this channel. Should the brushes be out of phase one of the other lamps will light and the attendant will know just what distance to adjust brushes 1755 to cause the proper lamp to light.

The two four-channel distributors provided at each of stations ER and ET are adjusted for phase independently of the eight-channel cable distributors. Inasmuch as the four-channel distributors at each station are mounted on a common shaft both sending distributor faces thereof are set for phasing by a single switch 1828 and both receiving distributor faces of the four-channel distributors at station ET are tested for phasing by a single switch 2326. The phasing of these distributors is much the same as that of the eight-channel distributors, except that the phasing impulses are repeated directly to the receiving rings 2323 and 2325 by receiving relays 2312 and 2313, no vibrating relay circuit being required. When the proper phase is obtained at stations ER and ET the attendants restore the phasing switches, which operation disconnects the lamps and connects the printer and reperforator mechanisms in preparation for receiving signals.

At the end of the interval necessary for the above adjustments, the attendants at stations WT and ER respectively, restore switches 745 and 2030, thereby preparing the high speed section of the system for transmission of messages. The low speed section may be similarly prepared by restoring the switches 1828 and 2326.

The next adjustment is that of the corrector mechanism. The timing mechanism at each station is first set to zero. To do so, the attendant at the west terminal, for example, disengages latch 824 and rotates cam 825, lowering the gears on shaft 818 away from the driving gears of timing cams 815, 816 and 817. These cams are now set at zero by means of dials and markers on the supporting frame (not shown) as is also shaft 818. The contact operating arm 826 is moved into cooperation with a timing cam, giving a closure at the end of one minute intervals. Shaft 827 is then drawn back, opening clutch 820 and locked under latch 828. The shaft 818 is then restored to engagement with the timing cams. This operation is performed at each station. The attendants at station CR and ER also respectively operate keys 1418 and 1939 to prepare the operating circuits of magnets 1420 and 1940. After a predetermined interval the attendant at station WT operates key 746, and when the brush 726 contacts with the first segment of the No. 8 channel, a circuit is closed from positive battery, the second contact from the left end of key 756, first segment of No. 8 channel of ring 721, brush 726, ring 720, left inner contact of cam 319, conductor 612, a contact of relay 614 through vacuum tube repeater 615, sending network 618, middle contact of relay 616, conductor 923 of cable 617, lower contact of relay 917, anti-resonant network 926, shaping network 912, vacuum tube amplifier 913, synchronizing relay 915 and signal relay 914, back to sea-earth on conductor 936. Signal relay 914 operates and closes the circuit extending from positive battery over its right contact, inner left contact of cam 1215, through the left hand or holding winding of relay 1114 of the vibrating relay circuit, outer right contact of cam 1215 to the opposite side of battery connected to the right contact of relay 914. Relay 1114 operates and connects positive battery to a circuit for operating printer relay 1116. Relay 1116 operates and connects positive battery to a circuit extending over the closed contacts of cam 1222, ring 1012, brush 1027 and the first active segment of channel No. 8 of ring 1013, operated contacts of switch 1418 through the winding of magnet 1420 to negative battery. Relay 1420 operates releasing clutch 1421 to start the timing operations at station CR.

The operating circuit for relay 914 which extended to ground at 936 has a parallel path which extends through vacuum tube repeater 916, conductor 935, sending network 1512, middle contact of relay 1518, conductor 1520 of cable 1519, lower contact of relay 1620 through an anti-resonant circuit (not shown), shaping network 1612, amplifier 1613 through the windings of relays 1615 and 1614 back to sea earth return conductor of cable 1519. Realy 1614 operates and connects positive battery to the left hand or holding winding of relay 1616 of the vibrating relay circuit. Relay 1616 operates and connects positive battery to the windings of printer relay 1618. Relay 1618 operates and connects positive battery at cam 1914 to the eighth channel segment of ring 1712, brush 1755, to the first active segment of No. 8 channel on ring 1714 through the operated contacts of switch 1939, winding of magnet 1940 to negative battery. Magnet 1940 operates, releasing a clutch (not shown) but corresponding to clutch 1421 at station CR to start the operation of the timing mechanism indicated by the contact arm 1911, 1912, 1913, which correspond respectively to the contact arms connected to timing cams 815, 816 and 817 in Fig. 8, and cams 1415, 1416, and 1417 in Fig. 14.

The clutch magnet 822 at station WT is operated by a circuit from negative battery, outermost right contact of switch 746, left middle contact of switch 829, winding of magnet 822, inner right contact of switch 829, ring 722, brush 727, ring 723 to ground at switch 745.

As soon as the timing cams start rotating, switches 1939 at station ER, 1418 at station CR and 829 at station WR are restored and switch 2030 at station ER and lamp switches 438 and 1026 at stations WT and CR are operated. The corrector switches are also operated, switch 533 to correct backward and switch 1122 and the corresponding switch (not shown) but included in block 1625 at station ER, to correct forward. When the direction of transmission is reversed the attendants at stations WT and CR adjust their receiving brushes in response to the phasing signals transmitted by the sending distributor shown in Fig. 20 until the third lamp of the first channel on each of the receiving distributors shown in Figs. 4 and 10 lights.

Due to the no-impulse period, while transfer of direction of corrector control is being made, it is possible that the distributors may get slightly out of synchronism at that time. To overcome this the corrector brushes and the corrector rings at station WT are adjusted after each reversal of direction until the corrector mechanisms bring the distributors into synchronism by a few operations.

After a predetermined number of reversals the phasing and lamp switches are restored and test messages are sent over channels 1 and 2 to insure that the printers are operating properly. When everything is ready station WT transmits instruction as to which of the master timing cams of groups 815, 1415 and that associated with contact arm 1911 but not shown, is to be used. Immediately following the next change-over the control lever is moved to the proper cam and the system is ready for the transmission of messages.

*Transmission of letter codes*

To further elucidate the operation, let it be assumed that station WT is transmitting and that sending brush 726 is about to begin a revolution in the position shown. Assuming that the letter J is the next letter to be transmitted over channel No. 1 and L is the next letter to be transmitted over chanel No. 2, the tape of transmitter 712 will be punched so that the first, second and fourth tongues of transmitter 712 and the second and fifth tongues of transmitter 713 may close their respective contacts to marking polarity, and the third and fifth tongues of transmitter 712 and the first, third and fourth tongues of transmitter 713 close their spacing or normal contacts. Therefore, as brush 712 moves over the segments of channels Nos. 1 and 2, a series of pulses will be sent out over conductor 612, consisting of two negative, one positive, one negative and one positive pulse for channel No. 1, and of one negative, one positive, two negative and one positive pulse for channel No. 2, it being understood that in order to provide correction reversals when spacing signals are being sent and to assist in overcoming the "zero wander" effect produced in a submarine cable, that the spacing and the marking impulses are reversed in the alternate channels.

These pulses will be repeated through the vacuum tube repeater 615, sending network 618, over conductor 923 of cable 617, through the anti-resonant circuit 926, shaping networks 912, vacuum tube amplifier 913, the windings of relays 915 and 914 in series, vacuum tube repeater and shaping network 916, over conductor 935, through sending network 1512 to conductor 1520 of cable 1519. Only adjacent impulses of like polarity are of sufficient strength to operate relays 914 and 915, the impulses of unit length not being received in effective amplitude. The impulses repeated by relay 914 are impressed upon the vibrating relay circuit comprising relays 1114, 1115 and 1116, which in turn are operated to reproduce the received signals and to insert in their respective places impulses of unit length which are lost in transmission over cable 617. The impulses produced by the vibrating relay circuit are impressed through the closed contact of cam 1222, receiving rings 1012 and 1013, onto the monitoring printer devices 1018 and 1019, which reproduce the impulses as originally transmitted from station WT. The impulses repeated by relay 915 are effective through the closed contacts of cam 1216 to operate corrector relay 1117. Relay 1117 converts the received impulses into impulses of positive polarity, which are impressed through rings 1412 and 1413, on the right hand winding of auxiliary corrector relay 1118. Assuming that corrector switch 1122 is in the position shown to advance the speed of corrector mechanism 1121 the correcting impulses produced by relay 1118 cause the operation of corrector magnet 1120, which in turn operates and advances brush shaft 1123 with respect to the motor shaft 1124. It is further assumed that channels No. 1 and No. 2 are through channels and therefore no further description will be given of the operation of the floating transmitter 1318 which is described and claimed in the copending application of A. A. Clokey and E. T. Burton, supra.

The impulses of channels No. 1 and No. 2, which were stated to be impressed on cable 1519 are received at station ER in shaping network 1612, vacuum tube amplifier 1613 and the windings of relays 1615 and 1614 in series. The adjacent impulses of like polarity which were repeated from station CR are reproduced by relay 1614 and impressed on the left hand winding of relay 1616 of the vibrating relay circuit which also comprises relays 1617 and 1618, and distributor rings 1937 and 1938 shown in part only. The vibrating relay circuit operates into the impulse lengthener circuit through receiving rings 1712 and 1714. The impulse lengthener circuit arrangement which comprises three-electrode vacuum tubes 1715, 1716, etc., operating in parallel with condensers 1741 and 1742, respectively, requires the marking impulses reproduced by printer relay 1618 of the vibrating relay circuit to be of positive polarity in order to reproduce the signals in the plate circuits of the tubes and therefore the impulses received from station CR together with those inserted by the vibrating relay circuit at station ER are reproduced as positive or "no-current" impulses, relay 1618 reproducing the positive and negative impulses received from relay 1614 as positive and "no-current" impulses, respectively in channel No. 1 and as "no-current" and positive current impulses respectively, in channel No. 2 and so on for the remaining pairs of channels. The impulses produced by relay 1618 are therefore successively impressed upon the vacuum tubes in rotation as brush 1755 rotates over ring 1714, an impulse of "no current," of course, not being effective to operate a tube which happens to be connected to the segment with which brush 1755 is engaged at the time such an impulse is received from relay 1618. The condensers connected in parallel with the tubes prolong the impulses of positive current sufficiently to operate selector magnets 1727, 1728, etc., it being understood, however, that only those magnets associated with the tubes receiving positive current impulses are affected. Therefore, the transmitted signals, $--+-+$ of channel No. 1, and $-+--+$ of channel No. 2 are reproduced by relay 1618 as $++0+0$ and $0+00+$, the zeros representing the "no-current" impulses. These signals operate the first, second and fourth magnets of channel No. 1 and the second and fifth magnets of channel No. 2.

The operation of the selector magnets 1727, 1728 and 1730 causes the signal transmitted over channel No. 1 to be perforated on a tape which is then passed through tape check 1732 to transmitter 1812. The operation of the second and fifth magnets of channel No. 2, not shown, but represented by block 1751 causes the signal transmitted over channel No. 2 to be perforated on the tape which is passed through one of the tape checks represented by block 1739, to transmitter 1817.

Tape checks 1732 and 1738 are for use in channels No. 1 and No. 4 respectively, and block 1739 represents the tape checks for channels Nos. 2 and 3 and block 1740 those of channels Nos. 5, 6, 7 and 8. The reperforators each comprising five selector magnets, are arranged to operate into two groups of transmitters 1812 to 1815 and 1816 to 1819 which groups are respectively connected to duplex lines 2112 and 2113. The duplex lines are arranged to be operated at approximately one-half the speed of cables 617 and 1519 and therefore the duplex lines are each operated over four channels in the same time that it takes the cable to be operated over eight channels. This is accomplished by feeding the tapes of the reperforators of the odd numbered cable channels into transmitters 1812 to 1815 and those of the reperforators of the even numbered cable channels into transmitters 1816 to 1819, for example, reperforators of cable channels Nos. 1 and 8 simultaneously feed tape to transmitters 1812 and 1816, reperforators of cable channels Nos. 3 and 2 to transmitters 1813 and 1817, reperforators of channels Nos. 5 and 4 to transmitters 1814 and 1818, and reperforators of cable channels Nos. 7 and 6 to transmitters 1815 to 1819.

Accordingly when brush 1826 rotates over the first channel segments on ring 1821, the signals from the reperforator employing tape check 1732, cause to be connected to duplex line 2112 negative battery over the first, second, and fourth tongues and positive battery over the third and fifth tongues of transmitter 1812 and when brush rotates over the second channel segments of ring 1824 the signals from the reperforator associated with the cable channel No. 2 will cause to be connected to duplex line 2113, negative battery over the second and fifth tongues and positive battery over the first, third and fourth tongues of transmitter 1817. The signals sent by transmitter 1812 are transmitted over conductor 2126 through the armature and right contact of relay 2219, the V. T. repeater 2212, right contact and armature of relay 2220, the windings of relay 2313, artificial line 2327 to ground. The signals are reproduced by relay 2313 to operate the first, second and fourth selector magnets of printer 2318 as brush 2328 rotates over the first channel segment of ring 2325. The signals sent by transmitter 1817 are transmitted over conductor 2127 through similar equipment as that described above for the signals from transmitter 1812 to operate relay 2312, which reproduces the signals for operating the second and fourth magnets of printer 2315 when brush 2329 rotates over the second channel segment of ring 2323. The printers at station ET have, therefore, recorded the first and second channel signals transmitted from station WT. The signals for the remaining channels are transmitted in like manner.

It is understood that such features as metering, Morse code signaling, "zero wander" correction, monitoring by siphon leak recorders, balancing of signal polarities impressed on the cable particularly in systems employing an odd number of channels, as disclosed in the Curtis Patent 1,689,328, may be readily embodied in the system herein described.

What is claimed is:

1. An impulse transmission system comprising a high speed and a low speed transmission line, terminal stations and a repeating station including a repeater interconnecting said lines, characterized in this that means are provided at the repeating station whereby upon reversal of transmission throughout the system the direction of transmission of the repeater is reversed.

2. A telegraph system comprising a high speed transmission line, a plurality of lower speed lines connected to said high speed line to divide and carry the signaling impulses, synchronous distributing devices at remote points on a plurality of said lines, characterized by the provision of means for reversing the direction of transmission and for maintaining synchronism among said devices during the intervals wherein the reversals are effected.

3. A telegraph system comprising a transmission line having a plurality of extensions, terminal stations connected to the opposite ends of said line, means at one of said terminals for simultaneously transmitting signals over the plurality of extensions, and means at the other of said terminals for separately receiving the signals transmitted simultaneously from the first of said terminals over a single line.

4. In a telegraph system comprising a transmission line, synchronized rotary distributors at the terminals of said line, said line having a plurality of extending lines, terminal stations connected to said line and its extending lines, means at one of said terminals for transmitting signals to and from said line over a single extending line and means at the terminals of the plurality of extending lines for simultaneously receiving different groups of signals transmitted from the transmitting terminal.

5. A telegraph system comprising a transmission line having a plurality of extensions connected at an intermediate point, terminal stations connected to said line and its extensions, means at one of said terminals for transmitting signal combinations over said line, means at said intermediate point for separating said combinations into groups and for transmitting said groups over said extensions, respectively, and means at the terminations of said extensions for simultaneously receiving the different groups of signal combinations in combination with mechanism for reversing the direction of transmission throughout the whole system.

6. A multiplex telegraph system having terminal stations and a repeating station means for transmitting messages over a plurality of channels arranged for simplex operation, means for reversing the direction of transmission at times, vacuum tube repeating means at said repeating station capable of repeating signals passing in each direction, and means at said repeating station common to both directions of transmission for terminating one of said channels and for employing the outgoing channel corresponding to the terminated channel for transmitting a different message to a distant station, said means when connected to so terminate said one channel serving to prevent the terminated message from further transmission.

7. A multiplex telegraph system in accordance with claim 6, wherein the means for terminating one of said channels in either direction of transmission provide for arbitrary selection of the particular channel.

8. A multiplex telegraph system comprising a line having terminal stations and a plurality of receiving stations for transmitting messages over a plurality of channels arranged for simplex operation, means at said ranged for simplex operation, means at said stations for simultaneously reversing the direction of transmission at predetermined intervals, vacuum tube repeaters at certain of said repeating stations and a rotary repeater at the other of said repeating stations, and means at one of said repeating stations capable of connection to terminate messages from either direction on one of said channels and for employing the outgoing channel corresponding to the terminated channel, for transmitting a different message to the distant receiving station, said means when connected serving to prevent the terminated message from further transmission over its corresponding channel.

9. A multiplex telegraph system arranged for simplex operation and comprising a transmission line having a plurality of extensions connected thereto at a point, terminal stations connected to said line and its extensions, means at the terminations of said extensions for simultaneously transmitting messages over a plurality of channels, means at said point for simultaneously receiving the messages simultaneously transmitted and repeating them in their proper sequence, means at the terminal of said line for receiving in successive order the messages simultaneously transmitted, means at each of said stations for reversing the direction of transmission at predetermined intervals, means at certain of said stations for employing signal impulses to effect synchronism with the transmitting station, and a pilot line interconnecting the other of said stations for effecting synchronism between said other stations independently of the stations utilizing the signals for synchronizing.

10. A multiplex system comprising a main transmission line having a plurality of extensions, terminal stations and repeating stations connected to said line and its extensions, a plurality of one-way repeaters in each of said extensions for repeating signals in either direction, means at the junction of said line and extensions for separating signals on the incoming channels into groups and transmitting said groups individually over said extensions, and other means at said point for combining groups of signals, received simultaneously over the channels of said extensions, into one group for transmission over the main transmission line.

11. A telegraph system comprising a high speed multiplex transmission line, a plurality of relatively low speed multiplex transmission lines balanced for duplex operation, a high speed distributing device connected to said high speed line and a plurality of low speed distributing devices connected to said low speed lines, and slow operating repeating devices interconnecting said high speed and said low speed distributing devices whereby the speed of transmission of said high speed line is maintained in transmitting signals over said low speed lines in either direction.

12. A telegraph system comprising terminal stations, a high speed transmission line divided into a plurality of sections and arranged to transmit over a plurality of channels, a plurality of repeating stations interconnecting said sections, means at one of said repeating stations for terminating any one of said channels and for substituting a channel, corresponding to the channel so terminated, for transmission over the remaining high speed line section, a plurality of relatively low speed transmission lines each arranged to transmit over a plurality of channels, and means for connecting said high speed line with said low speed lines whereby the signals transmitted from one of said terminals and passing in either direction over either of said low speed lines are received at the other of said terminals.

13. A telegraph system comprising a plurality of transmitting devices for transmitting signals at high speed over a plurality of channels, a plurality of relatively low speed signal lines, slow acting devices for registering the high speed signals, means intermediate said slow acting devices and said high speed line for prolonging the signals sufficiently to insure the operation of said slow acting devices, a signal relaying device for relaying the signals transmitted over each channel, said relaying devices being arranged in a plurality of groups, said groups being arranged to simultaneously transmit over said low speed lines the signals received successively over pairs of adjacent high speed channels.

In witness whereof, I hereunto subscribe my name this 6th day of March, 1929.

ALLISON A. CLOKEY.